(12) United States Patent
Gorelick et al.

(10) Patent No.: US 11,517,042 B2
(45) Date of Patent: Dec. 6, 2022

(54) DIGITAL MARKETING APPLICATIONS FOR ELECTRONIC CIGARETTE USERS

(71) Applicant: Altria Client Services LLC, Richmond, VA (US)

(72) Inventors: Joseph G. Gorelick, Holliswood, NY (US); Eyal Peleg, Tsoran (IL); Dorron Levy, Givatayim (IL); Robert Levitz, North Miami Beach, FL (US); Bernard G. Juster, Netanya (IL)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 870 days.

(21) Appl. No.: 13/949,988

(22) Filed: Jul. 24, 2013

(65) Prior Publication Data

US 2013/0319439 A1    Dec. 5, 2013

Related U.S. Application Data

(63) Continuation-in-part of application No. 13/870,654, filed on Apr. 25, 2013, now abandoned.
(Continued)

(51) Int. Cl.
*A24F 13/02* (2006.01)
*A24F 40/00* (2020.01)
(Continued)

(52) U.S. Cl.
CPC .............. *A24F 13/02* (2013.01); *A24F 40/00* (2020.01); *A24F 40/53* (2020.01); *A24F 40/65* (2020.01);
(Continued)

(58) Field of Classification Search
CPC .............. G06Q 30/0261; G06Q 30/02; G06Q 30/0267; G06Q 30/0271; A24F 47/008;
(Continued)

(56) References Cited

U.S. PATENT DOCUMENTS 5,144,962 A    9/1992  Counts et al.
5,507,277 A    4/1996  Rubsamen et al.
(Continued)

FOREIGN PATENT DOCUMENTS

CN    201294864       8/2009
CN    102006790 A     4/2011
(Continued)

OTHER PUBLICATIONS

International Search Report and Written Opinion dated Feb. 24, 2015.
(Continued)

*Primary Examiner* — Michael J Felton
*Assistant Examiner* — Yana B Krinker
(74) *Attorney, Agent, or Firm* — Harness, Dickey & Pierce, P.L.C.

(57) ABSTRACT

An electronic cigarette ("e-Cig") may include functionality for targeted marketing. The marketing may be through communications with a computing device, such as a smartphone. For example, a smartphone application may be used for monitoring e-Cig usage and collecting data regarding the user and the usage. That data may result in targeted marketing. In another example, location information may also be used for targeted advertisements from a retailer.

15 Claims, 14 Drawing Sheets

Related U.S. Application Data

(60) Provisional application No. 61/826,686, filed on May 23, 2013, provisional application No. 61/637,980, filed on Apr. 25, 2012.

(51) Int. Cl.
*A24F 40/65* (2020.01)
*A24F 40/53* (2020.01)
*H04L 67/12* (2022.01)
*A24F 40/10* (2020.01)
*A24F 40/30* (2020.01)

(52) U.S. Cl.
CPC .............. *A24F 40/10* (2020.01); *A24F 40/30* (2020.01); *H04L 67/12* (2013.01)

(58) Field of Classification Search
CPC .......... A24F 40/00; A24F 40/40; A24F 40/50; A24F 40/51; A24F 40/53; A24F 40/60; A24F 40/65; A24F 40/80
See application file for complete search history.

(56) References Cited

U.S. PATENT DOCUMENTS

| | | | |
|---|---|---|---|
| 6,095,153 A | 8/2000 | Kessler et al. | |
| 6,606,997 B2 | 8/2003 | Brue | |
| 6,975,202 B1 | 12/2005 | Rodriguez et al. | |
| 8,045,961 B2 | 10/2011 | Ayed et al. | |
| 2001/0052846 A1 | 12/2001 | Jespersen | |
| 2002/0194500 A1 | 12/2002 | Bajikar | |
| 2004/0177674 A1 | 9/2004 | Read et al. | |
| 2007/0226778 A1 | 9/2007 | Pietruszka | |
| 2008/0183801 A1 | 7/2008 | Marton et al. | |
| 2009/0095287 A1 | 4/2009 | Emarlou | |
| 2009/0133691 A1 | 5/2009 | Yamada et al. | |
| 2009/0320863 A1 | 12/2009 | Fernando et al. | |
| 2011/0036346 A1 | 2/2011 | Cohen | |
| 2011/0226266 A1 | 9/2011 | Tao | |
| 2011/0265806 A1* | 11/2011 | Alarcon | A24F 47/00 131/273 |
| 2011/0277756 A1 | 11/2011 | Terry et al. | |
| 2011/0305606 A1 | 12/2011 | Kilby | |
| 2012/0047011 A1* | 2/2012 | Rippetoe | G06Q 30/02 705/14.45 |
| 2012/0048266 A1* | 3/2012 | Alelov | A24F 40/50 128/202.21 |
| 2012/0197090 A1 | 8/2012 | Chen et al. | |
| 2012/0199146 A1 | 8/2012 | Marangos | |
| 2012/0199572 A1 | 8/2012 | Shen et al. | |
| 2012/0227753 A1 | 9/2012 | Newton | |
| 2012/0291791 A1 | 11/2012 | Pradeep | |
| 2013/0042865 A1 | 2/2013 | Monsees et al. | |
| 2013/0074032 A1 | 3/2013 | Barragan Barragan et al. | |
| 2013/0104916 A1 | 5/2013 | Bellinger et al. | |
| 2013/0186392 A1 | 7/2013 | Haartsen et al. | |
| 2013/0220315 A1 | 8/2013 | Conley et al. | |
| 2013/0255702 A1 | 10/2013 | Griffith, Jr. et al. | |
| 2013/0284192 A1 | 10/2013 | Peleg et al. | |
| 2013/0298905 A1 | 11/2013 | Levin et al. | |
| 2013/0340775 A1 | 12/2013 | Juster et al. | |
| 2014/0020693 A1 | 1/2014 | Cochand et al. | |
| 2014/0107815 A1 | 4/2014 | LaMothe | |
| 2014/0123989 A1 | 5/2014 | LaMothe | |

FOREIGN PATENT DOCUMENTS

| | | |
|---|---|---|
| CN | 201828919 U | 5/2011 |
| CN | 202014572 U | 10/2011 |
| CN | 102523304 | 6/2012 |
| CN | 202489175 U | 10/2012 |
| CN | 102970885 A | 3/2013 |
| CN | 202819629 U | 3/2013 |
| CN | 202873795 U | 4/2013 |
| CN | 103734916 A | 4/2014 |
| DE | 202013105420 U1 | 4/2014 |
| EP | 2110034 A1 | 10/2009 |
| EP | 2253233 A1 | 11/2010 |
| EP | 2454956 A1 | 5/2012 |
| EP | 2999367 B1 | 10/2020 |
| UA | 99958 C2 | 10/2012 |
| WO | WO-2011146174 A2 | 11/2011 |
| WO | WO-2012/027350 A2 | 3/2012 |
| WO | WO-2012047346 | 4/2012 |
| WO | WO-2012/085919 A2 | 6/2012 |
| WO | WO-2014085719 A1 | 6/2014 |
| WO | WO-2014150704 A2 | 9/2014 |
| WO | WO-2014199233 A2 | 12/2014 |

OTHER PUBLICATIONS

International Preliminary Report on Patentability and Written Opinion dated Nov. 24, 2015.
International Search Report and Written Opinion dated Dec. 22, 2014.
Bo Li et al., "i-Function of Electronic Cigarette Building Social Network by Electronic Cigarette," 2011 IEEE International Conferences on Internet of Things, and Cyber, Physical and Social Computing, 2011, pp. 634-637.
European Office Action dated May 9, 2017 in European Application No. 14 786 269.2.
U.S. Office Action dated May 19, 2017 in U.S. Appl. No. 13/898,094.
Non-Final Office Action dated Mar. 5, 2019 in U.S. Appl. No. 13/898,094.
Final Office Action dated Mar. 6, 2019 in U.S. Appl. No. 13/870,654.
Summons to attend Oral Proceedings pursuant to Rule 115(1) issued on Oct. 22, 2019 in European Application No. 14 793 300.6.
Extended European Search Report for European Application No. 20204207.3, dated Apr. 20, 2021.
U.S. Appl. No. 61/826,686, filed Oct. 31, 2013, Gorelick.
U.S. Appl. No. 61/637,980, filed Oct. 31, 2013, Levy et al.
European Notice of Opposition for Application No. 14793300.6, dated Aug. 4, 2021.
European Notice of Opposition for Application No. 14793300.6, dated Aug. 11, 2021.
Chinese Office Action dated Dec. 29, 2018 in Chinese Application No. 201480041795.9.
Notice of Opposition filed Nov. 21, 2018 in European Patent No. EP3000245 by Nicoventures Trading Limited.
Notice of Opposition filed Nov. 27, 2018 in European Patent No. EP3000245 by Nerudia Limited.
Official Action dated Sep. 10, 2018 in Russian Application No. 2015154554.
Substantive Examination Adverse Report dated Sep. 14, 2018 in Malaysian Application No. PI 2015002785.
Chinese Office Action dated Mar. 27, 2018 issued in Chinese Application No. 201480041795.9 (English translation included).
U.S Office Action dated Dec. 20, 2017 issued in U.S. Appl. No. 13/898,094.
Chinese Office Action dated Nov. 14, 2018 for Chinese Application No. 201480041053.6, with an English language translation.
European Office Action dated Nov. 16, 2018 in European Application No. 14793300.6.
Non-Final Office Action dated Aug. 30, 2018 in U.S. Appl. No. 13/870,654.
Final Office Action dated Jun. 15, 2018 in U.S. Appl. No. 13/898,094.
Communication pursuant to Article 94(3) EPC dated May 28, 2018 in European Application No. 14 793 300.6.
Extended European Search Report dated Jul. 31, 2018 issued in European Application No. 18158716.3.
U.S. Appl. No. 13/939,987, filed Jul. 11, 2013.
U.S. Appl. No. 13/870,654, filed Apr. 25, 2013.
U.S. Appl. No. 13/898,094, filed May 20, 2013.
U.S. Office Action dated Nov. 30, 2016 issued in U.S. Appl. No. 13/870,654.
Russian Office Action dated Apr. 3, 2018 issued in Russian Application No. a201512513 (English translation included).

(56) References Cited

OTHER PUBLICATIONS

U.S. Office Action dated Nov. 3, 2016 issued in U.S. Appl. No. 13/898,094.
U.S. Office Action dated Sep. 23, 2016 issued in U.S. Appl. No. 13/939,987.
U.S. Office Action dated Apr. 5, 2016 issued in U.S. Appl. No. 13/870,654.
Russian Office Action and Search Report dated Apr. 10, 2018 in Russian Application No. 2015154554.
First Office Action dated Apr. 28, 2018 in Chinese Application No. 201480041053.6.

* cited by examiner

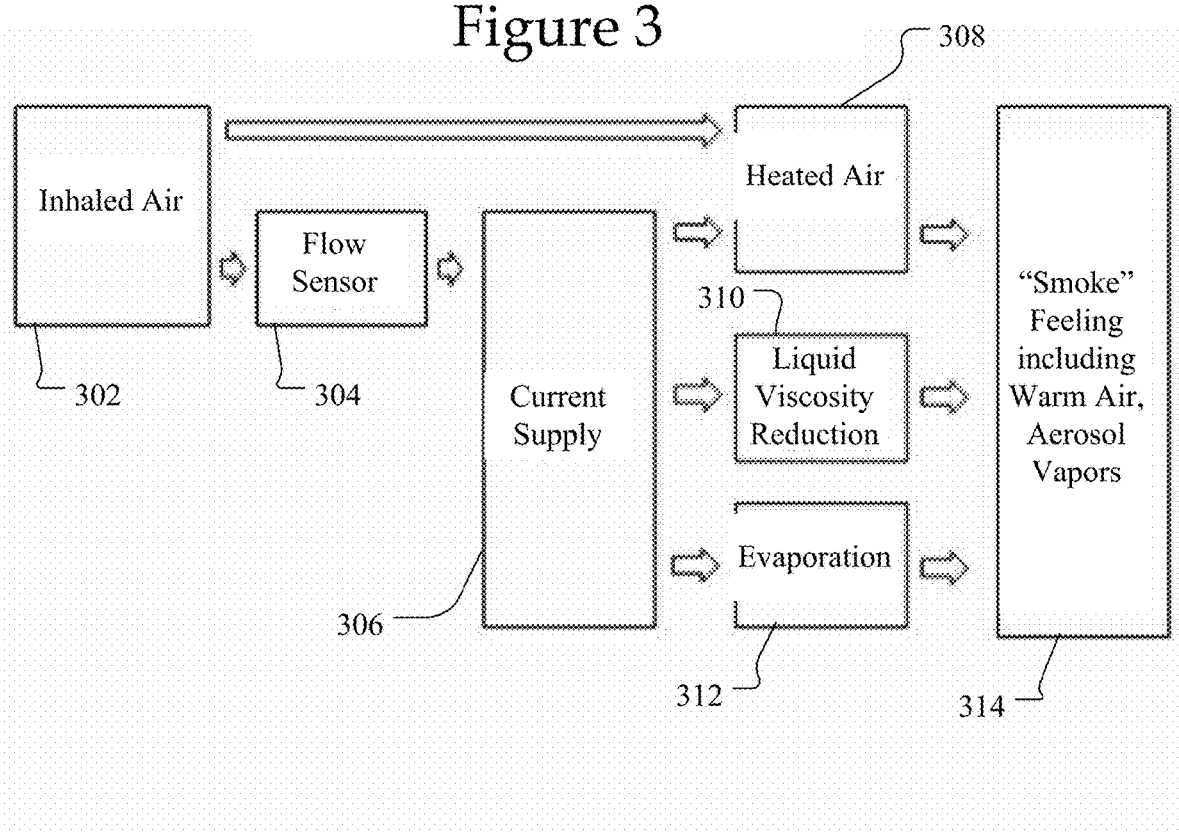
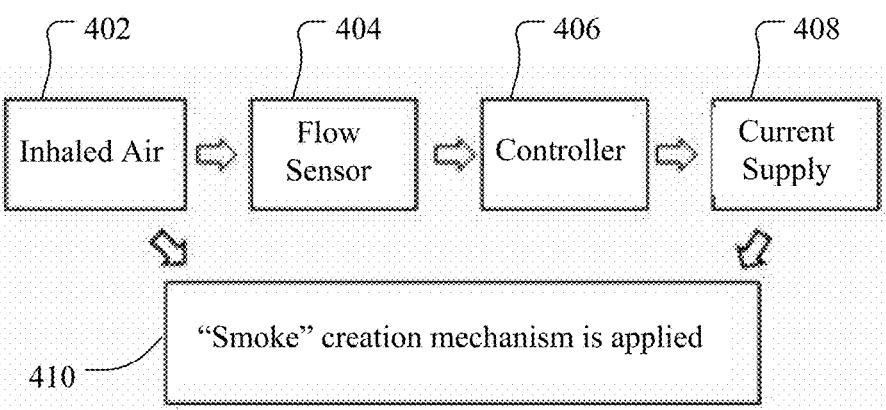

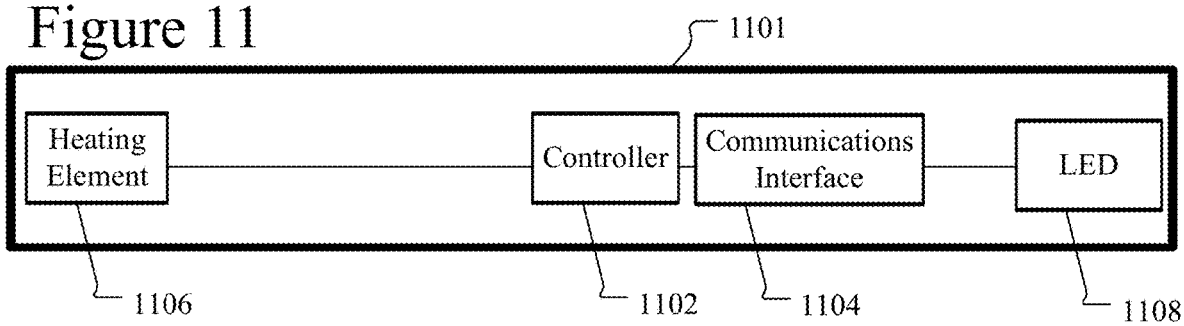
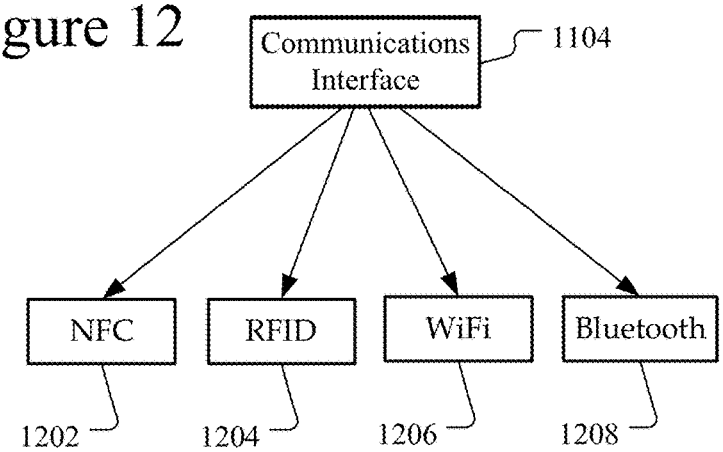
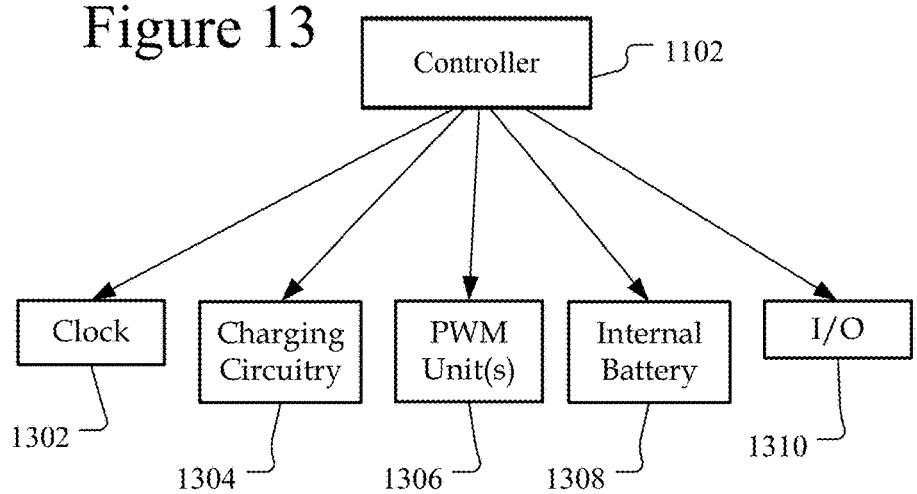

DIGITAL MARKETING APPLICATIONS FOR ELECTRONIC CIGARETTE USERS

PRIORITY CLAIM

This application claim priority to provisional Application No. 61/826,686, filed on May 23, 2013, entitled "DIGITAL MARKETING APPLICATIONS FOR ELECTRONIC CIGARETTE USERS;" and this application claims priority as a Continuation-in-Part to U.S. patent application Ser. No. 13/870,654, filed on Apr. 25, 2013, entitled "ELECTRONIC CIGARETTE WITH COMMUNICATION ENHANCEMENTS," which claims priority to provisional Application No. 61/637,980, filed on Apr. 25, 2012, entitled "Electronic Cigarette with Communication Enhancements," the entire disclosure of each of which are hereby incorporated by reference.

This application is related to U.S. application Ser. No. 13/898,094, entitled "APPLICATION DEVELOPMENT FOR A NETWORK WITH AN ELECTRONIC CIGARETTE," filed on May 20, 2013; and U.S. Prov. App. No. 61/825,304, filed on May 20, 2013, entitled "BURNING PREDICTION AND COMMUNICATIONS IN AN ELECTRONIC CIGARETTE CARTOMIZER," the entire disclosure of each of which are hereby incorporated by reference.

BACKGROUND

Smoking may be an activity with certain social implications. For example, social factors may influence the decision to start smoking or may be one reason for smoking in groups (from couples to people who go out to smoke together, to parties etc.). The social benefits of smoking without certain of the downsides may be achieved with an electronic cigarette ("e-cigarette" or "e-Cig"), which is a device that emulates tobacco cigarette smoking, by producing smoke replacement that may be similar in its physical sensation, general appearance, and sometimes flavor (i.e., with tobacco fragrance, menthol taste, added nicotine etc.). The device may use heat, ultrasonic energy, or other means to atomize/vaporize a liquid (for example based on propylene glycol, or glycerin, for example including taste and fragrance ingredients) solution into an aerosol mist. The atomization may be similar to nebulizer or humidifier vaporizing solutions for inhalation. The generated mist may be sensed similar to cigarette smoke. Because it is electronic, an e-Cig may provide opportunities for increased options, communication, and control.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

FIG. 3 is a flow diagram of the electronic cigarette smoking process;
FIG. 4 is a flow diagram of components for the electronic cigarette;
FIG. 11 is another exemplary electronic cigarette;
FIG. 12 is a diagram illustrating communications interface examples;
FIG. 13 is a diagram illustrating exemplary controller components.

DETAILED DESCRIPTION

Figure 1:
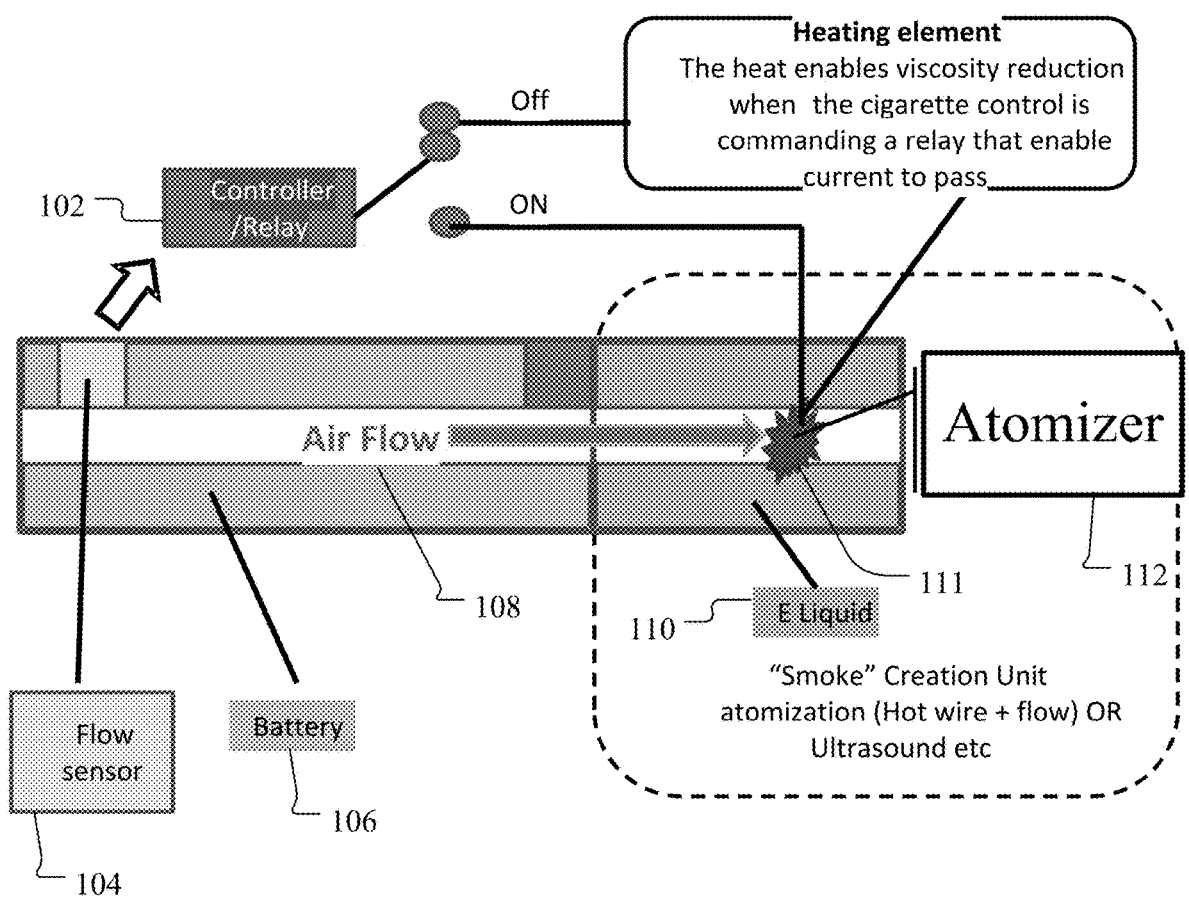
FIG. 1 is a diagram of an electronic cigarette.

The system and method described herein are for an electronic cigarette ("e-Cig") that may include functionality for targeted marketing. The marketing may be through communications with a computing device, such as a smartphone. For example, a smartphone application may be used for monitoring e-Cig usage and marketing based on that monitoring. Location information may also be used for targeted advertisements from a retailer.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Although commonly referred to as a smoker throughout, a user of an e-Cig may also be referred to as a vapor and the act of "smoking" may be referred to as vaping. Likewise, a non-electronic cigarette may be referred to as a "regular" or "standard" cigarette, but should be understood to include non-electronic cigarettes. Although mist generation (or atomization) may be described interchangeably with vaporization, the concepts are distinct. The use of the term vaporization, vapor, or vaping should be understood to include the mist generation or atomization process.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

By way of introduction, an electronic cigarette ("e-Cig") may include a controller for providing various operations within an e-Cig. Enhancements for the controller may provide for improved operations and control for the e-Cig. In one embodiment, there may be a communications capability which may be separate from or part of the controller. The communications may allow for the e-Cig to communicate with a consumer device, such as a computer, smartphone or tablet. The consumer may then control smoke properties, monitor operations, adjust settings, and/or receive product notifications or offers through the consumer device's communication with the e-Cig. Control may also be enabled for automatic services, such as messaging from commercial parties, by servers, by local area network ("LAN")-located entities, such as a smart phone application, and/or by other persons (e.g. friends, supporters or social networks) that may be located locally or over a wide area network ("WAN") such as the Internet. Other possible applications may include smoking cessation support, by professionals or peers (also my involve and incorporate other Nicotine Replacement Therapies (NRT), such as nicotine patches; competitions and challenges, for example of knowledge or taste recognition; related products marketing and sales, for example coffee or candy. The communications may enable connections to various websites on the Internet for usage tracking or social networking. Although commonly referred to as a smoker throughout, a user of an e-Cig may also be referred to as a vapor and the act of "smoking" may be referred to as vaping. Likewise, a non-electronic cigarette may be referred to as a "regular" or "standard" cigarette, but should be understood to include non-electronic cigarettes.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below.

FIG. 1 is a diagram of an electronic cigarette. The "smoke" produced by an e-Cig is a created by turning a liquid (e-Liquid 110) into mist and some vapor with an atomizer 112. The e-liquid 110 may have a high viscosity at room temperature to enable longer shelf life and reduce leakages; however, this high viscosity may reduce the atomization rate. The atomizer 112 is further described below with respect to FIG. 2. The e-Liquid 110 is atomized via air flow 108, generated by the inhalation of the user (i.e. the smoker or consumer or vapor), which produces a pressure difference that removes e-Liquid droplets from the e-Liquid 110. In one embodiment, the e-Liquid 110 may be soaked in a wick. In order to reduce the e-Liquid viscosity, to a level enabling atomization, external heat may be applied through a heating element 111 as further described below. In this embodiment, local viscosity reduction via heating, while inhalation occurs, enables e-Liquid atomization in the inhalation-generated flow of air 108. The e-Liquid 110 may be heated via an electric current flowing through the heating element 111 and may then be atomized and evaporated through the e-Cig and may contain tastes and aromas that create a smoking sensation.

The controller 102 may be activated due to air flow 108 (from the inhaled air) passing a flow sensor 104. The sensor 104 may be activated by the pressure drop across the sensor and may directly switch the battery 106 power on, or be used as an input for the controller 102 that then switches the battery 106 current on. Although illustrated as separate from the e-Cig, the controller 102 may be a part of the e-Cig (e.g. along with the battery 106). The enhancements to the controller 102 are further described below with respect to FIGS. 7-13, and include external communications from a communications chip. The communications described below may allow for increased control of properties of the sensor 104, battery 106, air flow 108, e-Liquid 110 or atomizer 112. In particular, the controller 102 may be configured for external communication to other computing devices and/or networks.

In one alternative embodiment, the battery 106 may be a separate/removable assembly. The battery 106 may include one or more electronic chips controlling and communicating from it. It may receive cartomizers. Conversely, a disposable e-Cig may include the battery 106 as a single unit. In another alternative embodiment, the battery 106 keeps a trickle current on. The trickle current may keep the communication link alive, while main current for the heating element 111 is only activated by the flow sensor 104.

Figure 2:
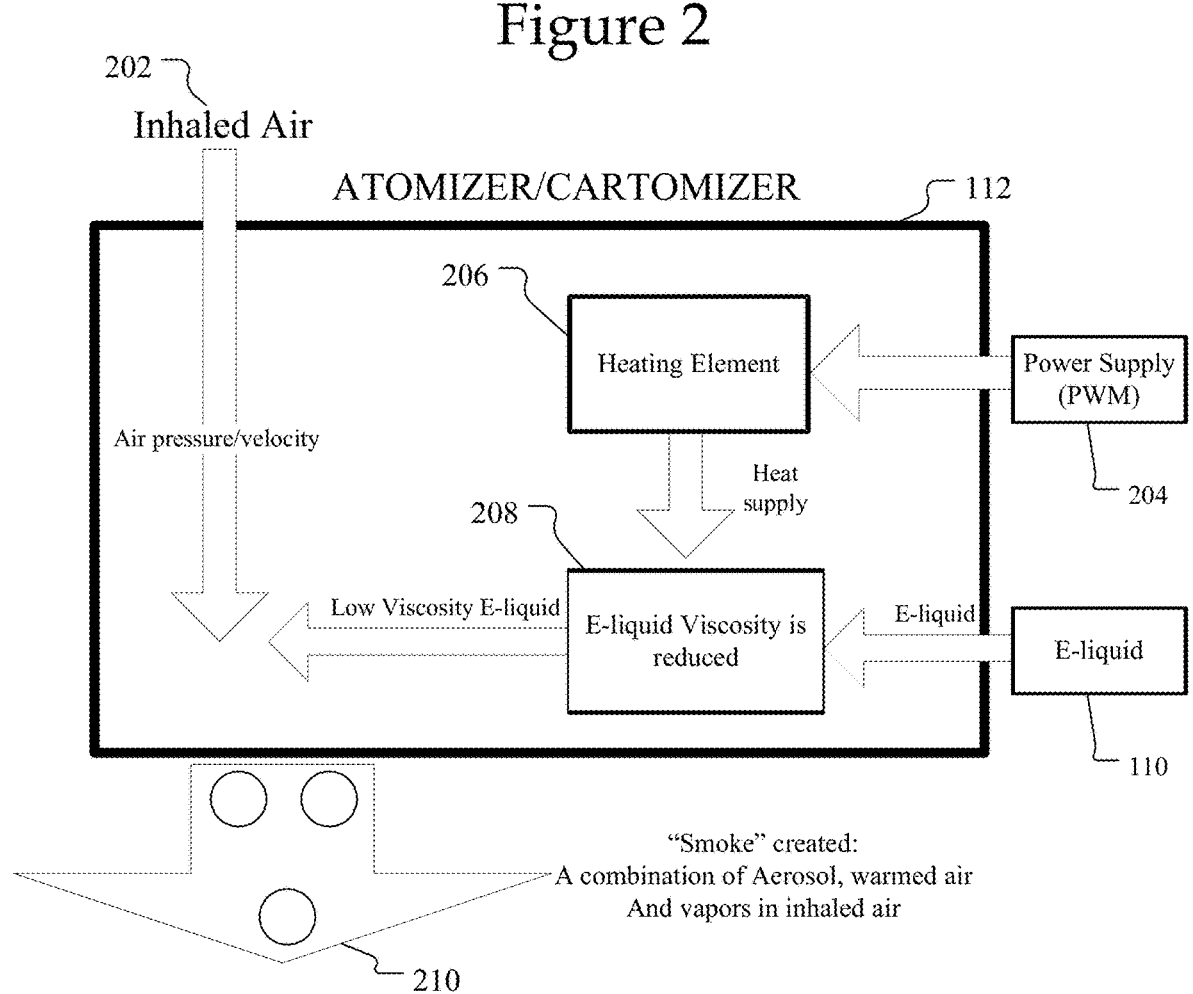
FIG. 2 is a diagram of an atomizer.

FIG. 2 is a diagram of the atomizer 112. The inhaled air 202 is passed through the atomizer 112. A heating element 206 (which may be separate from the atomizer 112 in alternate embodiments) supplies heat to the E-liquid 110, which reduces viscosity 208. Due to the heating element 206, the e-Liquid 110 viscosity over temperature profile may be designed in a way such that when heated its viscosity will be reduced to a level where atomization may be effective (with the pressure shear forces and velocities that can be created with inhalation activity). The heating element 206 may be powered through a power supply 204. The low viscosity e-liquid and the inhaled air 202 result in the smoke 210. The smoke 210 is not a traditional smoke, but is instead a combination of aerosol, warmed air and vapors, and may be referred to as a vapor.

The atomization may be the process that makes an aerosol. When a gas is injected under pressure difference through a tube with a narrowing cross-section, it speeds up, generating a pressure drop at the narrowest point due to Bernoulli's principle and creates Venturi's effect. The narrowing cross-section may enable pressure reduction in that the narrowing results in a velocity increase and pressure drop. The reduced pressure, due to the pressure difference between the two points, sucks up a liquid from a reservoir through a narrow tube or tubes into the moving gas flow, and projects it forward as a fine spray of droplets. When liquid is moved through wick capillaries a pressure difference may be effective in creating shear forces. The generated microscopic droplets are then sucked in to the mouth and upper respiratory tract. Droplet size can be influenced by the internal structure of the e-Cig, and its working conditions, including liquid properties, liquid temperature while atomized, heating energy, flow local macro and micro structure, inhalation force, etc. The e-Liquid 110 may be purchased and interchangeable within the e-Cig for adding flavor to the smoke 210.

FIG. 3 is a flow diagram of the electronic cigarette smoking process. The inhaled air 302 passes through a flow sensor 304. The e-Cig power source is a battery (or other power source, e.g. other electrical sources) which may be a part of the e-Cig that provides a current supply 306. The current supply 306 may be triggered by the controller which may be activated due to air flow 302 passing a flow sensitive switch or flow sensor 304. This sensor can switch the battery power or may be an input for the controller. When controller is activated it enables power to a heating resistance element (e.g. heating element 206). In one embodiment, the heating element 206 may be a heating coil. The power may be controlled using Pulse Width Modulation ("PWM") signaling. E-Liquid may be located in a container where a capillary device such as wick leads it to a place where inhaled air 302 have flow conditions that enable creation of pressure drop and/or shear forces that will enable aerosol creation. Heating of the e-Liquid in the wick by a coil or heating element may reduce viscosity 310 of the e-Liquid and enable aerosol creation through evaporation 312. The aerosol creation may result in a smoke feeling for a user. The resultant smoke/vapor 210 may include warm air, aerosol, and vapors 314. In one embodiment, the e-Liquid may flow through the coil, which may be wrapped around a wick in the e-Cig. The inhaled air flows across the wick such that the inhaled air flow may induce turbulent flow. A local air vortex may enable high pressure drops and shear forces that create aerosol from at least part of the e-Liquid soaked in the wick.

FIG. 4 is a flow diagram of components for the electronic cigarette. FIGS. 1 and 3 illustrate exemplary e-Cig components and processes for smoke creation. FIG. 4 illustrates a simplified embodiment of certain components. Inhaled air 402 passes through a flow sensor 404, which may notify a controller 406 of the presence of the inhaled air 402. The controller 406 may signal a current supply 408 which begins the smoke creation mechanism 410. As discussed above, the smoke creation mechanism 410 may include an atomizer and/or heating element for creating the aerosol. FIG. 4 illustrates how the e-Cig is activated upon sensing the inhaled air. This basically "turns on" the e-Cig for creating the aerosol for the user to engage in the smoking process. When the power supply is not enabled, atomization and vaping is prevented.

Figure 5:
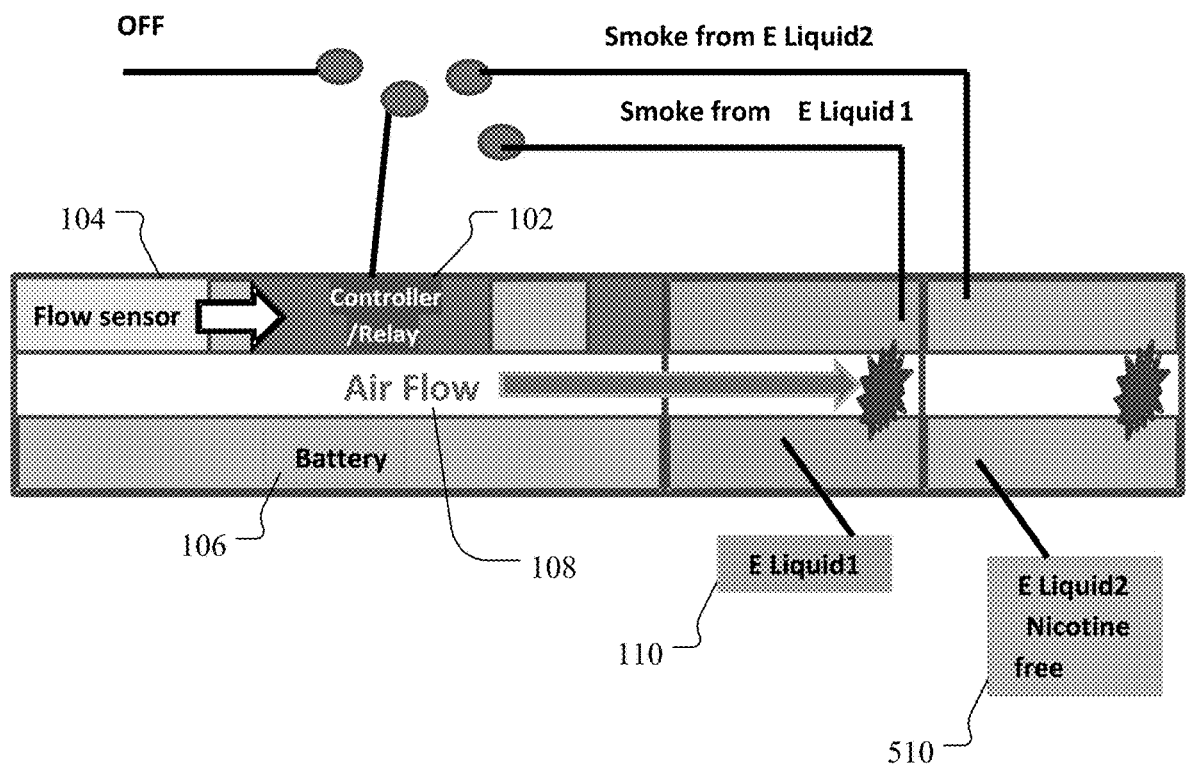
FIG. 5 is an alternative diagram of an electronic cigarette with multiple e-Liquids.

FIG. 5 is an alternative diagram of an electronic cigarette with multiple e-Liquid containers. The e-Cig in FIG. 5 may be similar to or the same as the e-Cig in FIG. 1 except it includes multiple e-Liquids. The e-Cig may include a first e-liquid 110 as with FIG. 1, but also includes a second e-Liquid 510. The aerosol or smoke from the two e-Liquids may be combined to enhance or modify the flavor produced with just a single e-Liquid. In one embodiment, an e-Liquid with nicotine may be combined with an e-Liquid that is nicotine free. The controller may determine which e-Liquid is utilized for vaping. In one embodiment, the user may interact with the controller to switch between the e-Liquids. Alternatively, the controller may automatically select the e-Liquid based on usage patterns or may switch between the e-Liquids during inhalation.

The e-Liquids may be sensed by constant resistance measurement of the heating element when the cartomizer is removed or disconnection occurs. Likewise, when another cartomizer is assembled it may be sensed and restricted until it is confirmed with the controller (e.g. by a smartphone as discussed below).

Figure 6:
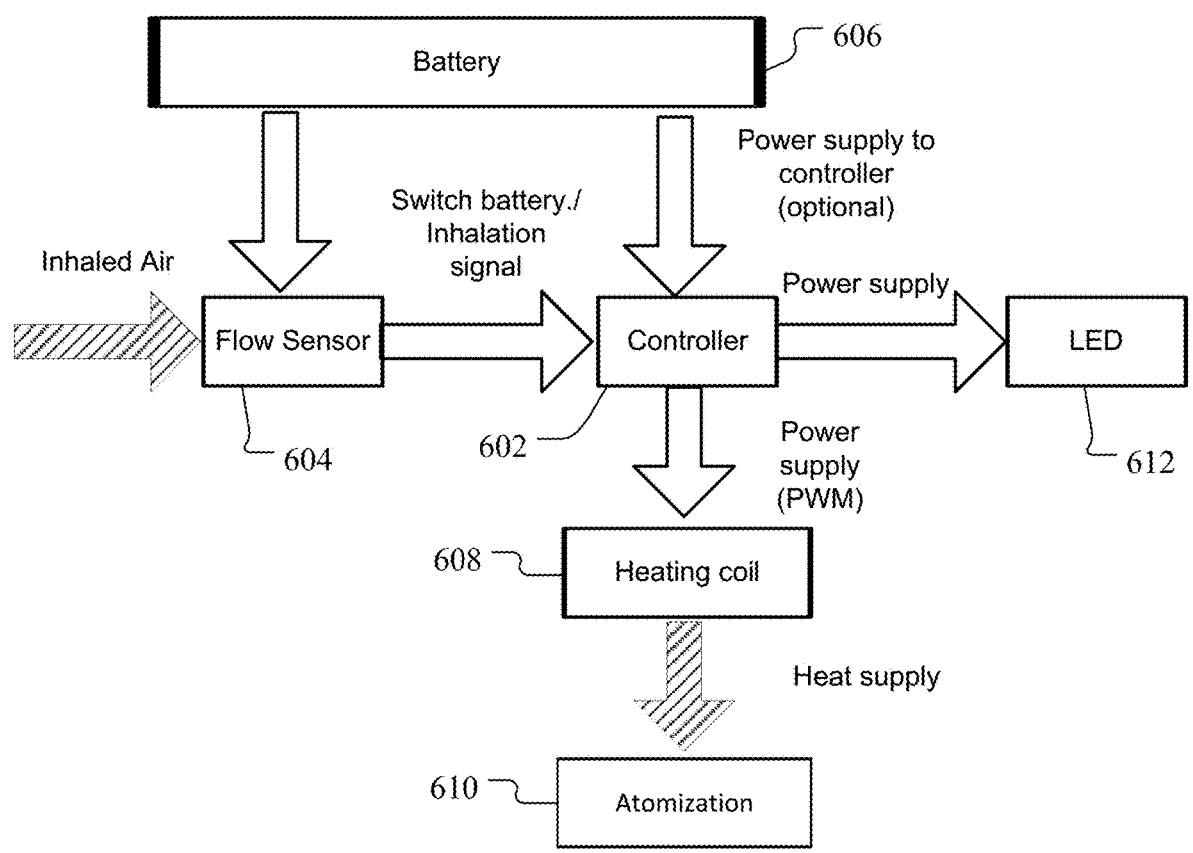
FIG. 6 is an alternative diagram of components in an electronic cigarette.
Figure 7:
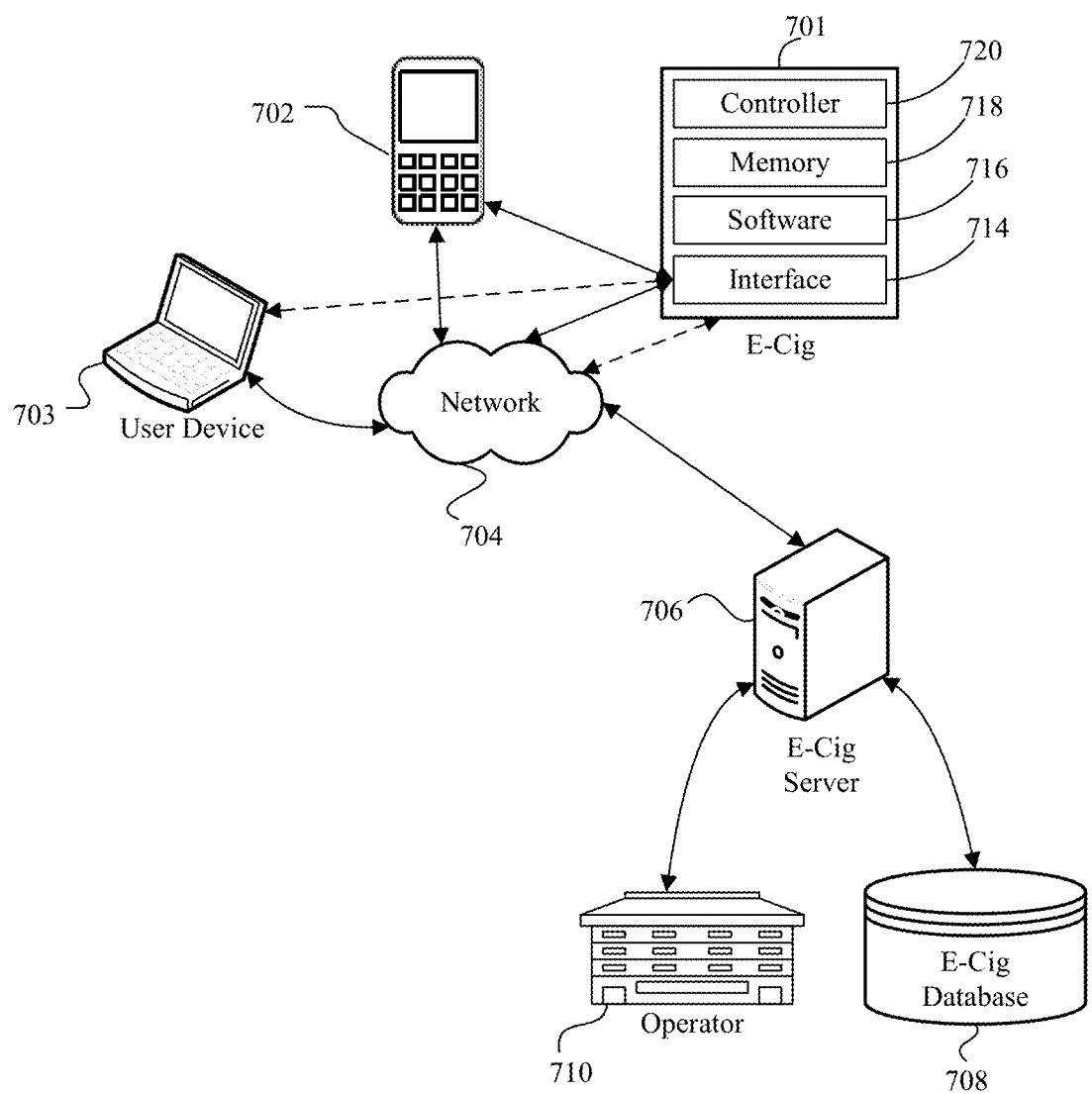
FIG. 7 is a network diagram with an electronic cigarette.

FIG. 6 is an alternative diagram of components in an e-Cig. The e-Cig may be the e-Cig illustrated in FIG. 1 or 5. FIG. 7 below includes a further description of additional components of an e-Cig. FIG. 6 illustrates the flow of different functions of the e-Cig. In this embodiment, the e-Cig power source is a battery 606 which is part of the e-Cig. The battery 606 may be lithium-ion in one example. The controller 602 may be activated due to air flow (from the inhaled air) passing a flow-sensitive switch or flow sensor 604. The sensor 604 may be activated by a pressure drop across the sensor. This sensor 604 may directly switch the battery 606 power on, or be used as an input for the controller 602, that then switches the battery 606 current on. This process is further described above with respect to FIGS. 1-3. The controller 602, when activated, enables, in a specific embodiment, a Pulse Width Modulation ("PWM") control over the heating coil 608 power. Heating of the liquid by the heating coil 608 reduces viscosity of the e-Liquid which may enable atomization 610.

In parallel the controller 602 may power up a light emitting diode ("LED") 612 light source at the e-Cig tip. The LED 602 light may imitate the cigarette light. In one embodiment, the light color may be changed to distinguish it from regular (non-electronic) cigarettes. For example, the LED may be green. The light may mimic the brightness of the fire/burn of a non-electronic cigarette. In other words, the lighting is different, for example turned on, for while receiving inhaled air. Accordingly, there may be an analog or digital electrical circuit that enables the light to increase and/or cease gradually. This setup may be translated to electrical circuits in more than a single way (for example the pressure switch can switch the power to the controller or only enable a signal to be transmitted to the controller). The e-Cig LED or light at its tip may be changed according to ambient illumination. For example, the light power may be reduced when driving at night or may be modified based on location. For example, the color may change when smoking indoors or in a restaurant. The change may be controlled by the smartphone, utilizing its various sensors.

FIG. 7 is a network diagram including an e-Cig 701. FIG. 7 illustrates a consumer device 702 and user device 703 that are coupled with a network 704. The consumer device 702 may be directly (or locally) coupled with the e-Cig 701. Through the network, an e-Cig server 706 may store (in database 708) and communicate information to/from the e-Cig 701. Herein, the phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The e-Cig 701 may be similar to or the same as the e-Cigs illustrated in FIGS. 1 and 5. As described below, the e-Cig 701 may communicate with a consumer device, such as a smartphone 702. A smartphone is merely one example of a device that may communicate directly/locally with the e-Cig 701 and connect with the network 704. Other devices may include a desktop computer or a portable device, such as a cellular telephone, a display pager, a radio frequency (RF) device, an infrared (IR) device, a Personal Digital Assistant (PDA), a handheld computer, a tablet computer, a laptop computer, a set top box, a wearable computer (e.g. glasses or watch), an integrated device or any computing device combining various features, such as features of the forgoing devices, or the like. However, the device will be labeled throughout this disclosure as a smartphone for simplicity. The smartphone 702 may also be referred to as a host or host device, while the e-Cig is the client or client device.

Figure 9:
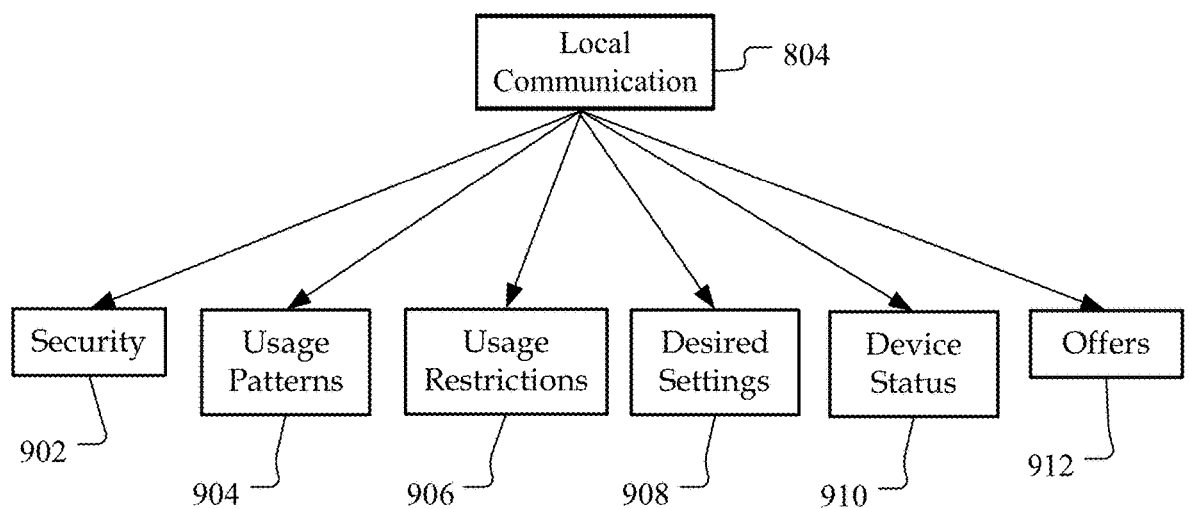
FIG. 9 is a diagram illustrating local communication examples.

The smartphone 702 may also be referred to as a client device and may include a computing device capable of sending or receiving signals, such as via a wired or a wireless network (e.g. the network 704, which may be the Internet). The smartphone 702 communicates directly with the e-Cig 701 through local communication mechanisms, such as those illustrated in FIG. 12. This communication with a smartphone 702 enables a user to have increased interaction and control of the e-Cig 701. Exemplary information communicated with the smartphone 702 is shown in FIG. 9.

The smartphone 702 may include or may execute a variety of operating systems, including a personal computer operating system, such as a Windows, iOS or Linux, or a mobile operating system, such as iOS, Android, or Windows Mobile, or the like. The smartphone 702 may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, WhatsApp, or Google+, to provide only a few possible examples. The smartphone 702 may also include or execute an application to communicate content, such as, for example, textual content, multimedia content, binary files, numerical data, or the like. The smartphone 702 may also include or execute an application to perform a variety of possible tasks, such as browsing, searching, playing various forms of content, including locally stored or streamed video, or games (such as fantasy sports leagues, or competitions such as e-Cig smokers competing on location-based assignments or any other games/activities involving community use). The foregoing is provided to illustrate that claimed subject matter is intended to include a wide range of possible features or capabilities. As described below, the smartphone 702 communicates with the e-Cig 701 and communicates over the network 704. Although not illustrated, the e-Cig 701 may communicate with other e-Cigs or multiple smartphones. In one embodiment, a couple may each have e-Cigs that can communicate with one another and that can communicate with each other's smartphones. This communication by the e-Cig may be through the network 704 in one embodiment. As further discussed below, the smartphone 702 may augments-Cig data with data from its own sensors, such as GPS, accelerometers, clocks, environmental parameters, microphone, and camera.

In one embodiment, the e-Cig 701 may include a controller 720, memory 718, software 716, and/or a communications interface 714. In alternative embodiments, the memory 718, software 716, and/or a communications interface 714 may be considered to be part of the controller 720. Alternatively, the memory 718 and/or software 716 may not be part of the e-Cig 701, rather the smartphone 702 will utilize its memory 718 (e.g. internal memory or external memory such as memory cards) and/or software 716 for the functions described below. In other words, functions performed by the smartphone 702 may be performed by the e-Cig 701 in certain circumstances, and functions performed by the e-Cig 701 may be performed by the smartphone 702 in other circumstances.

Figure 8:
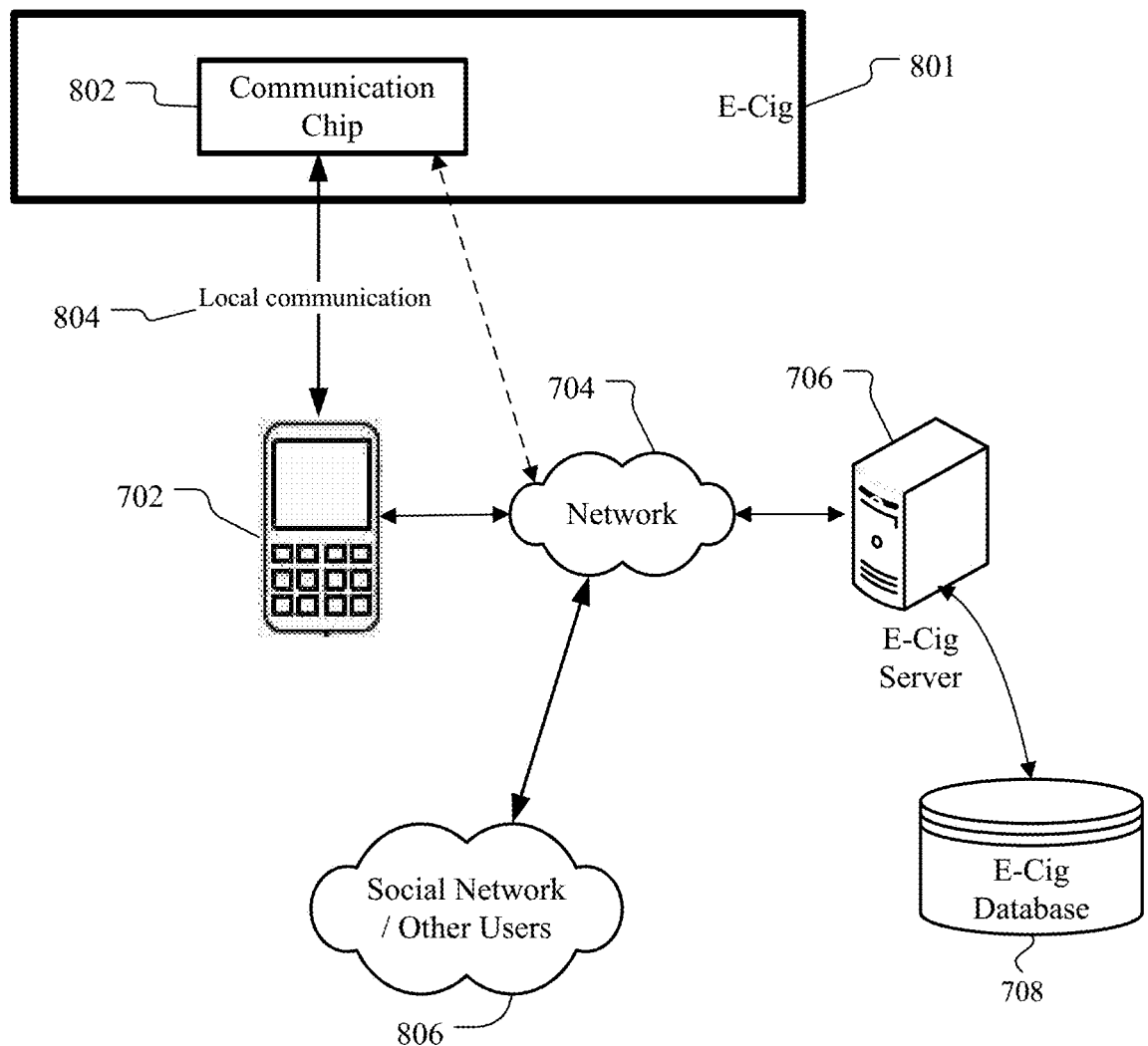
FIG. 8 is another network diagram with an electronic cigarette illustrating local and network communications.

The communications interface 714 may communicate with the smartphone 702. In one embodiment, the communications interface 714 includes a communication chip as illustrated in FIGS. 8 and 11. The communications interface 714 may include local/direct communication with the smartphone 702 using any of the interface mechanisms illustrated in FIG. 12.

The controller 720 in the e-Cig 701 may include a central processing unit (CPU), a digital signal processor (DSP) or other type of processing device. The controller 720 may be one or more general processors, digital signal processors, application specific integrated circuits, field programmable gate arrays, servers, networks, digital circuits, analog circuits, combinations thereof, or other now known or later developed devices for analyzing and processing data. The controller 720 may operate in conjunction with software or firmware (e.g. software 716), such as code generated manually (i.e., programmed). The controller 720 may be coupled with a memory 718, or the memory 718 may be a separate component or embedded within the controller 720. The software 716 may be stored in the memory 718. The memory 718 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 718 may include a random access memory for the controller 720. Alternatively, the memory 718 may be separate from the controller 720, such as a cache memory of a processor, the system memory, or other memory. The memory 718 may be an external storage device or database for storing recorded ad or user data. The memory 718 is operable to store instructions executable by the controller 720.

The functions, acts or tasks illustrated in the figures or described herein may be performed by the programmed processor executing the instructions stored in the memory 718. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like. The controller 720 is configured to execute the software 716. The software 716 may include instructions for analyzing, monitoring, and tracking e-Cig 701 data and communicating with the smartphone 702. The present disclosure contemplates a computer-readable medium that includes instructions or receives and executes instructions responsive to a propagated signal, so that a device connected to a network can communicate voice, video, audio, images, location, GPS information, accelerometer data, environmental sensors or any other data over a network.

The network (e.g. the network 704) may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices (e.g. the smartphone 702 or user device 703) with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

In one embodiment, the connection between the smartphone 702 and the e-Cig 701 is a direct/local connection (not through an external network such as the Internet), but alternative embodiments may allow for other connections between the smartphone 702 and the e-Cig 701. For example, the e-Cig 701 may communicate through the network 704 with or without the smartphone 702. Likewise, the e-Cig 701 may allow connections with more than one device (e.g. smartphone 702 and user device 703) that may be direct/local connections or connections through the network 704. Although not illustrated in FIG. 7, the communications mechanisms for the network 704 may apply to the connection between the smartphone 702 and the e-Cig 701.

In an alternative embodiment, there may be a wireless or wired charger or charging device that connects the e-Cig 701 and provides power for charging the battery. The smartphone 702 may act as a charger for the e-Cig 701 in one embodiment. Alternatively, the charger for the e-Cig 701 may be a separate device from the smartphone 702. For example, the charging device may be another computer (e.g. universal serial bus (USB)) that communicates with the e-Cig 701. There may be mutual charging between the smartphone and the e-Cig. In particular, the smartphone may provide a charge for the e-Cig and/or the e-Cig may provide a charge to the smartphone. An external charging device may charge both the smartphone and e-Cig, simultaneously or separately. The charging may be wired or wireless.

The e-Cig server 706 may be a server (e.g. web server) that provides the smartphone 702 with pages or information (e.g. through an app) that are requested over the network 704, such as by a user of the smartphone 702. In particular, the operator 710 may provide or collect information through the e-Cig server 706 when requested for or by the smartphone 702. The e-Cig server 706 may be operated by an operator 710 that maintains and oversees the operation of the e-Cig server 706. The e-Cig server 706 may be able to track information and provide offers stored in its database 708. The e-Cig database 708 may be coupled with the e-Cig server 706 and may store the information/data that is provided by the e-Cig server 706 to the e-Cig 701. Alternatively, tracking metrics and other properties/parameters of the e-Cig 701 may be communicated through the e-Cig server 706 for storage in the e-Cig database 708. The e-Cig server 706 may allow for individual or group communication with e-Cig users. For example, the e-Cig server 706 may communicate with a subset of users (e.g. to notify of an event, such as a group smoking party) or may be used for remote deactivations (e.g. if a defective batch is found).

The application ("app") that is provided by the smartphone 702 for interacting with the e-Cig 701 may include a variety of interfaces. In one embodiment, the app may include a rendering of the e-Cig that may illustrate the components of the e-Cig. The status of those components may be displayed on the app interface (e.g. battery level, e-Liquid level, LED color etc.). Accordingly, the app may be used for checking on the functionality of the e-Cig. In an alternative embodiment, this may allow the user to also light the e-Cig for a simulated smoke. The simulated smoke may be achieved through augmented reality. For example, augmented reality glasses may be used for enabling creation of smoke from the e-Cig when it is held by hand or on camera of the glasses.

The operator 710 of the e-Cig server 706 may include the manufacturer of the e-Cig or may be another third party company may monitor and facilitate the communications between the smartphone 702 and the e-Cig 701. In one embodiment, the e-Cig server 706 may provide an application (i.e. an "app") that is run on the smartphone 702 that implements the communication features discussed herein. In particular, the smartphone app may provide a user interface for all information stored in the e-Cig 701, the smartphone 702, and the database 708. The UI of the app displays that information and allows a user to modify any parameters for the e-Cig 701. Further, through the app, the enhanced controller of the e-Cig 701 may allow for the communication and interaction between the smartphone 702 and the e-Cig 701.

The e-Cig server 706 may be one or more computing devices which may be capable of sending or receiving signals over the network 704, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In addition, the e-Cig server 706 may be or may be part of a content server. A content server may include a device that includes a configuration to provide content via a network to another device (e.g. smartphone 702). A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc. A content server may further provide a variety of services that include, but are not limited to, web services, third-party services, audio services, video services, email services, instant messaging (IM) services, SMS services, MMS services, FTP services, voice over IP (VoIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type or programmable consumer electronics, etc. As described herein, the e-Cig server 706 may host information (e.g. a website) that is used for interfacing with the smartphone 702 and the e-Cig 701. In one embodiment, the user device 703 may view a web page provided by the e-Cig server 706 to see information about the e-Cig 701 and to monitor/track/control the e-Cig 701 depending on the access settings for the e-Cig 701.

The user device 703 (other than the smartphone 702) may interact with the smartphone 702 and/or the e-Cig 701. The other user device 703 may not have a direct/local connection with the e-Cig 701 as with the smartphone 702, but it may be coupled with the smartphone 702 and/or e-Cig 701 through the network 704 in one embodiment. The examples and operation of the user device 703 may be the same as that discussed above with respect to the smartphone 702. In one example, a user may modify settings of the e-Cig 701 from a laptop computer. For example, social networking may be used for a user who wishes to limit usage and another user (e.g. user device 703 from the user's social network) may be given remote control of the amount and/or frequency that the e-Cig 701 can be used for.

FIG. 8 is another network diagram with an electronic cigarette illustrating local communication 804. The communications interface 714 in FIG. 7 may be used to provide instructions via a communication chip 802 or communications port (e.g. from the smartphone 702 or the user device 703) that is part of the controller or the e-Cig 801. The communication chip or port may be created in software or may be a physical connection in hardware and may be configured to connect with the smartphone 702 and/or the network 704. The connection with the smartphone 702 may be considered a local or direct communication 804 because the smartphone may need to be in proximity of the e-Cig 801 for the connection. The connection may be wired (e.g. USB cable) or wireless using a variety of wireless connection mechanisms as illustrated in FIG. 12. In alternative embodiments, the connection between the communication chip 802 and the smartphone 702 may be through other mechanisms such as those discussed above with respect to the network 704.

The local communication 804 may be two-way communication between the smartphone 702 and the communication chip 802. The information that is transmitted is further described with respect to FIG. 9. FIG. 9 is a diagram illustrating local communication 804 examples. The local communications 804 may include security information 902. There may be a passcode, password, facial recognition, or other identifier that is required to establish a connection between the e-Cig 801 and the smartphone 702. RFID or other communication mechanisms may also be used for the security information 902. Alternatively, the e-Cig may detect a presence of the previously connected smartphone (or vice-versa) for re-establishing communications. In particular, the e-Cig 801 may be configured to only communicate with authorized smartphones. Each e-Cig may have its own password or security key that are required at the smartphone for establishing communication. The e-Cig may be locked to a specific user, thus helping to prevent misuse by unauthorized users such as minors. This locking may be through a connection with a particular smartphone. In other words, if the e-Cig is not near the smartphone, then it is disabled, inoperable or limited to a certain number or rate of puffs.

The local communication 804 may include usage patterns 904 or usage restrictions 906. In one example, the smartphone can be used for tracking the usage patterns of the e-Cig. The time and duration of smoking may be recorded and tracked. The user may be able to establish self-imposed restrictions on their smoking. For example, a user may restrict usage to five times daily and no smoking allowed between certain times. In another example, the user may use different e-Liquids (e.g. by selection from FIG. 5) to reduce a Nicotine level according to a certain plan by parting each inhalation between the e-Liquids. In another example, a user may puff slower in the mornings, so the temperature may be increased, leading to potentially smaller droplets. This pattern recognition may be utilized to tailor the e-Cig to the user and react to the user's patterns. Other parameters that may be adjusted automatically based on usage patterns or otherwise updated by the smartphone include current, voltage, temperature, power, e-Liquid selection/replacement, droplet size, viscosity, or airflow resistance. The airflow resistance may be through a selectable orifice (e.g. a rotating disc with several holes of various sizes in it) that may be placed in the airflow track. The usage patterns that are recorded may also include the type of e-Liquids that are used. Accordingly, there may be offers 912 made to the smartphone for a refill of a popular e-Liquid or a recommendation based on the user's usage pattern. In one embodiment, the smartphone app may allow for the manual or automatic reordering of a particular taste when an e-Liquid is running out. The smartphone app may follow up the history of usage of each cartomizer, and prevent usage if for example it counts the number of puffs and, for example taking into account the length of puffs, it determines that the cartomizer is about to be depleted and thus avoiding the burnt taste. Exemplary methods of knowing that the cartomizer is depleted may include follow up of temperatures, knowing the time and puffs numbers that the specific user had before each replacement of cartomizers, and more. In many of these applications the identification of a specific cartomizer is utilized, for example via bar-code, QR code or RFID tag. When liquid is finished the higher temperature may create a burned taste that can be avoided by monitoring the liquid level. Another example may limit a number of puffs according to the cartomizer, according to batch of production, or according to information received from the company through the e-Cig server about limiting the number of puffs.

The local communication 804 may include desired settings 908 or device status 910. The desired settings 908 may be similar to usage restrictions, but may include default settings relating to the generation of the aerosol. For example, increased temperature of the heating coil results in a different vapor. Additional settings may include vapor, droplet size, nicotine content, taste, and/or degree of liquid depletion or aging of the e-Cig's cartomizer. The local communication may further include complementary information from a smartphone that may be retrieved from the smartphone sensors, GPS, accelerometers, microphone, or other features of the smartphone. This information may be used for supplementing the usage of the e-Cig (e.g. the location that a user prefers). Accelerometer measurements may also be used for monitoring the handling of an e-Cig. An e-Cig may be sensitive to handling (for example accelerations), so the e-Cig acceleration history may be monitored, recorded, and analyzed to sense if an acceleration threshold has been reached, or to sense e-Cig lifetime duration influence. This may also assist in error or defect identification. A malfunctioning e-Cig may be determined to be caused by poor handling. The smartphone microphone may also be used for defect or error detection to listen to the e-Cig for a potential problem. For example, a gurgle or other noise may indicate a current or future problem.

The user may be able to configure the generation of the smoke using the smartphone. The device status 910 may include information about the components of the e-Cig. For example, if there is a component that is malfunctioning (e.g. the battery needs recharging or the LED is out), the smartphone may be notified. Likewise, updates to the e-Cig (e.g. controller or firmware updates) may be transmitted from the smartphone. The smartphone may further be configured to both locate and identify a particular e-Cig. It may also recognize whether a particular e-Liquid is a match for the cartomizer and vice-versa.

Although not shown in FIG. 9, the communications with the e-Cig may include social networking communications that may include accessing social connections over a network such as the Internet. In one embodiment, the e-Cig server 706 may maintain (e.g. in its database 708) a network of e-Cig users. Each user's smartphone allows for social interactions between that network of users. A user may receive notifications about the activity of others in that user's social network. The users in the social network may be selected by the user using the smartphone or may be automatically identified based e-Cig usage and/or geography. For example, a user that is smoking at a particular location may alert other users so that others can join. This notification may be automated through the smartphone application and the e-Cig server. Likewise, other users' interests/preferences/usage patterns may be shared within the social network. If there is a user with a similar usage pattern or preferences (e.g. e-Liquid type), that user's preferences may be communicated to similar users for identifying new settings, locations for smoking, and/or products (e.g. e-Liquid).

As described, the enhanced communications of the e-Cig may include real-time social interaction. In one embodiment, the communication by the e-Cig may be through emails, text messages, photos, videos, or social network websites (e.g. FACEBOOK, TWITTER, LINKEDIN, etc.). The e-Cig may communicate information to a user's social circle. The communications may be controlled by the user. Commercial utilization of the communications may include on-line social marketing, sales, lead-generation, location-based offerings, market research and other applications. For example, communication offering a particular E-liquid may be made to the user such as when the current e-Liquid is running low, or when a new product is being offered that may be appealing to the user. The user may allow for a social network to be notified of which e-liquid is being used and how often. This communication may be used along with global positioning system ("GPS") technologies to encourage social smoking. For example, two users (with GPS activated) may be in the same area and can be notified of their proximity. There may also be a notification of smoking preferences (e.g. e-Liquid type/taste, smoking times/lengths) to help join the users. In addition, to social connections, the enhanced communications may also be through businesses that may be notified of local smokers and can then provide discounts/sales for those smokers to shop and/or smoke at that business. For example, a user may be notified when they are close to such a business and offered a discount or coupon. In other words, the e-Cig provides functionality for connecting to individuals (social networking) or businesses. Enabling technologies, such as wire-line and wireless (e.g. Wi-Fi or cellular) networking, photography (such as smartphone-embedded cameras with automated on-line capabilities), location-aware technologies (such as GPS) and many more may improve the online social interaction.

The social interaction provided through this enhanced communication may encourage social smoking, commercialize co-offerings to smokers, support smoking cessation, encourage grouping via brand, taste, habits and other possibly identity-related criteria, etc. For example, when an e-Cig smoker is smoking, her smartphone may be aware of the fact that she is smoking, and is posting this fact (with her prior approval) on a website enabling special offers, combined with her location (with her prior approval) and her speed (indicating she is walking). The smartphone application/app can present a special, targeted offer to the smoker, suggesting a discounted deal for coffee in a nearby coffee place, to go well with her e-Cig. A unique smoking-related offering can be made given to the fact that many smokers like to smoke while consuming coffee, as one example.

The application or app described herein may further be used for taste testing and combination exchanges. The e-Cig combined with the smartphone may test the response to tastes (either new or incumbent) or to taste combinations. The smartphone may transmit the data to the e-Cig server, where the aggregated data could be used for development, marketing, and product offerings. Accordingly, users would be providing feedback for future development.

When the user listens to music on the smartphone and smokes, the sound may be subtly changed based on the e-Cig usage. For example, during the puff the music may be subtly modified to compensate for the changes in the respiratory system in the head during the inhale. This change in sound may enhance the experience of smoking.

With smartphones and other devises that have input technologies that involve for example gestures, the LED at the e-Cig tip may be modulated to transfer data or commands to the device. The lighted tip may be used as a remote pen, under the proper command from the e-Cig for input or signaling purposes. Likewise, the e-Cig may be used as standard for length for smartphone photography.

Figure 10:
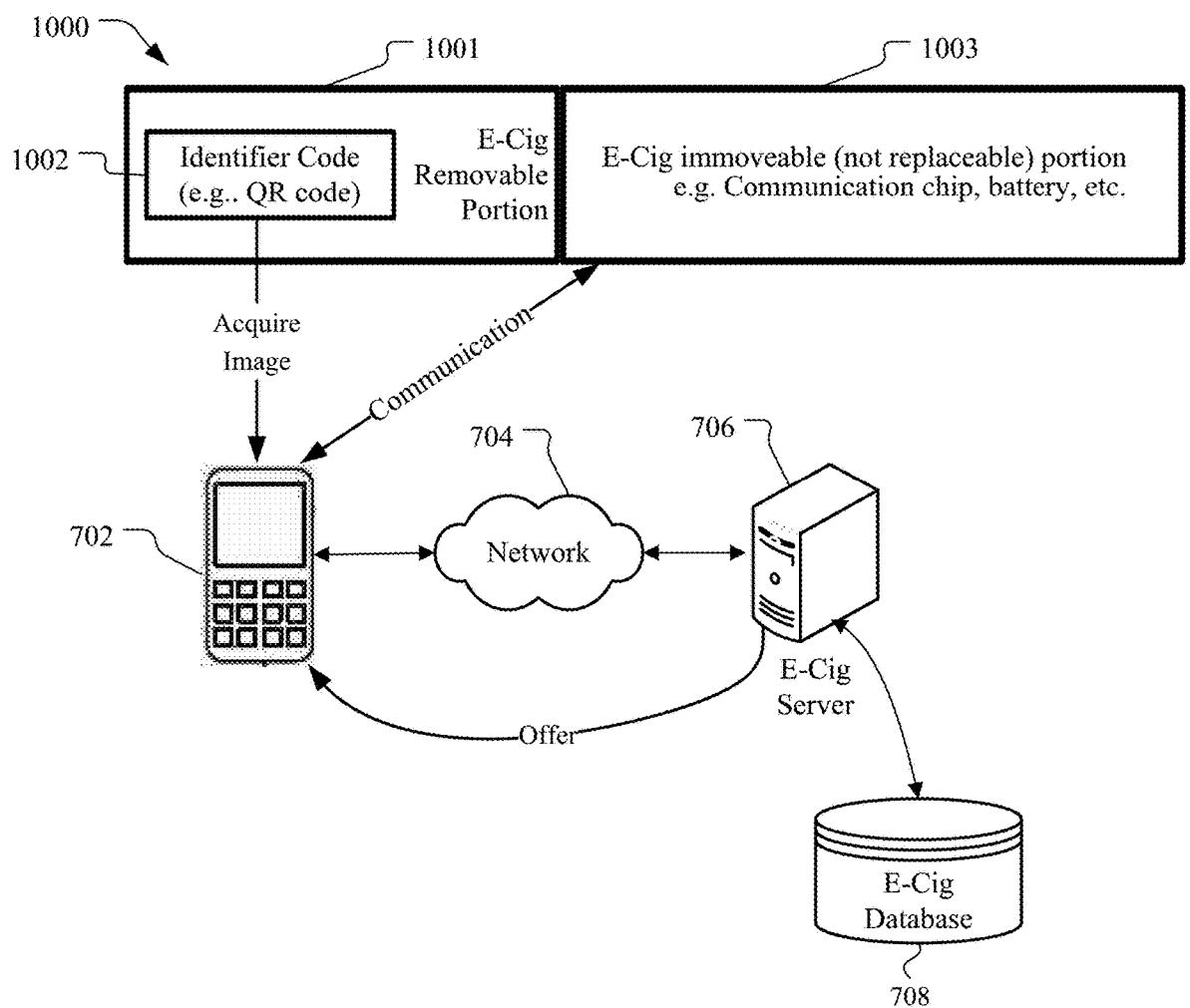
FIG. 10 is another network diagram with an electronic cigarette illustrating image acquisition.

FIG. 10 is another network diagram with an electronic cigarette illustrating image acquisition. In particular, the e-Cig 1000 may include an identifier code 1002, such as a 1-D or 2-D bar code (e.g. QR code) that can be scanned by the smartphone. In particular, the identifier code 1002 may be part of a removable portion 1001 of the e-Cig 1000. In one example of an e-Cig's connection with a device's camera, a scanned QR code or other bar may be scanned that is used for communicating information about an e-Cig. For example, a product code could be scanned and the consumer device can notify the user whether the product is compatible with the e-Cig. Additional communication (other than the identifier code 1002) may also be used for identifying a cigarette. The e-Cig may include a passive form of communication as shown in FIG. 10. There may be a camera-readable label, that can also be attached to other related devices such as Nicotine-Replacement-Therapy (NRT) devices like stickers. The communication chip functionality discussed above is an active form of communication.

The identifier code 1002 may enable identification of the cartomizer(s) type and taste(s) (e.g. via a QR-code or bar-code on the cartomizer). The identifier code may be read and identified by a smartphone camera and specific application software. In alternative embodiments, the identifier code may communicate with a RFID tag in the cartomizer and/or an NFC chip in the e-Cig and/or in the smartphone, combined with the proper software/application. External software programs, such as smartphone applications, websites, data-bases etc. (for example the e-Cig database) may be aware of a specific user's usage patterns and tastes. The ability to be specific about the special flavor of the e-Cig enables personalized offers to be most effective. To enable higher security the controller may not enable vaping until the identifier code is identified together with other communication and/or a password on the smartphone.

In one embodiment, the e-Cig 1000 may include a removable portion 1001 and an immoveable or permanent portion 1003. The immoveable or permanent (non-removable) portion 1003 may include a battery and controller, while the removable portion 1001 includes an e-Liquid and atomizer (e.g. cartomizer) that may be replaced. Different portions of the e-Cig 1000 may be part of either of the portions 1001, 1003. The LED may be installed in the cartomizer to enable a higher level of security.

FIG. 11 is another exemplary e-Cig 1101. The e-Cig 1101 illustrates an organization of the components that were previously discussed. The e-Cig 1101 may include a controller 1102, a communications interface 1104, a heating element 1106, and an LED 1108. Functionality provided by the controller 1102 is discussed with respect to FIG. 13. Exemplary communication mechanisms used by the communications interface 1104 are discussed with respect to FIG. 12. In one embodiment, the e-Liquid container (not shown) may include the heating element and an atomizer and may be referred to as a cartomizer. The cartomizer may be replaceable and removal of the cartomizer may be detected by the e-Cig. The LED 1108 may be ignited with inhaling and may be dimmed slowly after inhaling is finished to imitate the cooling tip of a non-electric cigarette when inhaling is ceased. The LED may further be modulated to send specific indications to the user, such as a blinking pattern to indicate low power or dwindling cartomizer e-Liquid.

FIG. 12 is a diagram illustrating communications interface 1104 examples. The e-Cig 1101 may communicate through a communications interface 1104 using near field communication ("NFC") 1202, radio frequency identification ("RFID") 1204, Wi-Fi 1206 (e.g. Wi-Fi Direct), Bluetooth 1208, and/or ZigBee. The communications interface 1104 may be implemented through a small-size communication chip embedded on the e-Cig. Exemplary chips may include but are not limited to a Bluetooth chip, such as Parani BCD 210 or Texas Instruments (TI) CC2650 Bluetooth Single-Chip Solution. These Bluetooth chips can be activated as slaves to a server, with the Bluetooth chip in the smartphone acting as the master. Another exemplary chip is an NFC-enabled chip (such as Qualcomm's QCA1990), that allows for NFC communication, or even enhanced Wi-Fi or Bluetooth communication where NFC is used for link setup. NFC may also be used to read an e-Cig or cartomizer identifier (as RFID device). Another exemplary communication chip may include a Wi-Fi-enabled chip, such as TI's SimpleLink family's CC3000, that can hook the e-Cig to Wi-Fi networks with full capability. An additional possibility may be a SIM card on board of the e-Cig, following the growing trend of cellular-enabled M2M (Machine to Machine) nano-SIM card, creating a cellular e-Cig that communicates directly to a network over 3G/4G cellular networks. Alternatively, there may be a wired connection (e.g. universal serial bus ("USB")) rather than a wireless connection. Alternative forms of communication may be used to establish two-way communication between an e-Cig and a smartphone.

FIG. 13 is a diagram illustrating exemplary controller 1102 components. As discussed, the controller for the e-Cig is enhanced with additional capabilities including communication abilities. FIG. 13 illustrates exemplary components that may be a part of the controller 1102 or may be separate components coupled with the controller 1102. A clock 1302 may be used for enhancing the controller of the e-Cig to be able to control parameters of any sub-unit. For example, an initial inhalation (starting a puff) may start the clock 1302 which is then used for measuring puff length and other usage patterns. The clock 1302 may enable a reliable report about the puffs made by the user which can then provide measurements of puff duration and intensity (rate per unit of time). This may be further usage pattern information that may enable more accurate social connections and targeted marketing. For example if the rate of puffs is increased there may be a situation where a nicotine craving is close and some parameters in e-Cig have to be changed. The clock 1302 may be synchronized with the smartphone when communication starts. The clock 1302 may provide a "time stamp" for every puff. These "time stamps" will be kept in memory of the e-Cig or smartphone and may be sent to the e-Cig server and database for storage.

The controller 1102 may include charging circuitry 1304 and a pulse width modulation ("PWM") unit 1306 for controlling the heating element and supplying a certain amount of controlled power. Alternatively, the PWM 1306 may enable battery 1308 activation. The charging of the battery 1308 may occur through an external charger or the smartphone. There may also be input/output ("I/O") 1310 circuitry for connections to/from the controller 1102. The power supply may be constant over time when a pressure difference switch is activated (e.g. when inhalation creates a pressure difference that passes a certain level). This may be accomplished with the PWM 1306 power supply.

In another embodiment, the controller may disable or reduce the power supplied to the heating element if an internal counter indicates that the user's smoke rate is higher than is allowed or when an allowed number of puffs has been reached, or when the number of puffs that indicates a spent cartomizer is reached. The user may utilize the app on the smartphone to set limits for frequency and duration that are communicated and enforced automatically by the e-Cig. It may include the ability to read from internal memory parameters and to change power supply mode or timing according to these parameters to the heating element. The controller CPU may be able to write to internal memory data about power supported by PWM power supply to heating elements. The controller may be able to analyze this data and to modify power supply to enable controlling for example voltage, amperage or any dependence between both.

The controller may further be configured to provide the ability to monitor and analyze any power consumption of any subunit, for example the power consumption of heating element. It may include the ability not to activate any unit at certain circumstances. For example, the heating element may warm the wick while disabling vaping.

The controller may be configured to idle with low power consumption when no inhalation or communication occurs. In one embodiment, the idle state may enable supply power to internal clock and an option to keep two-way communication in receive mode. The e-Cig may be in an idle state unless a particular action, such as vaping, cartridge replacement, movement, or a wake up call from the smartphone occurs. The smartphone app may be on receive mode unless it receives a wake up communication from the e-Cig. To enable idle state when the internal battery is finished the controller may have internal rechargeable battery with proper circuitry to load and unload it from a main power supply.

Figure 14:
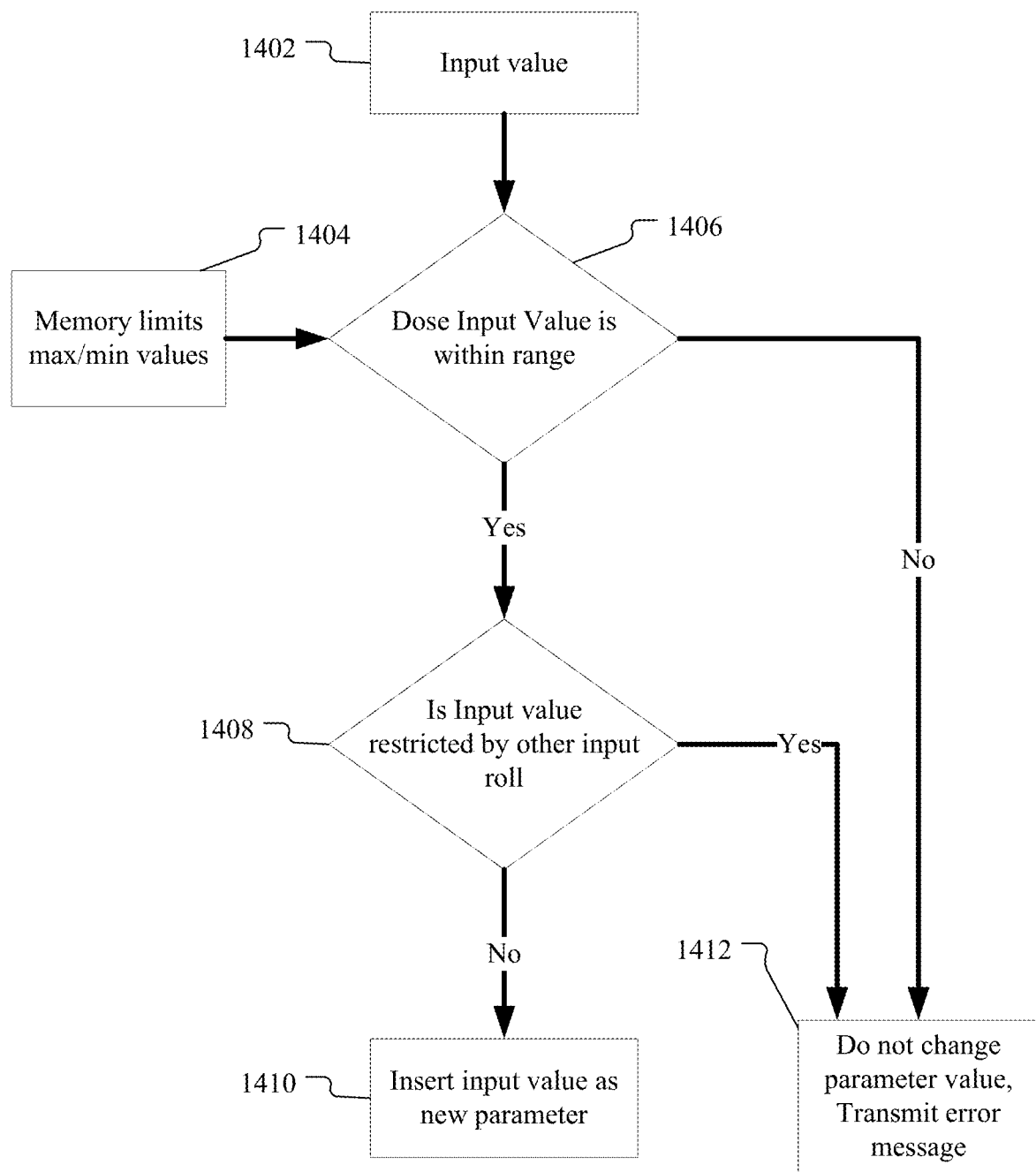
FIG. 14 is a flow chart for cigarette operation.

FIG. 14 is a flow chart for an algorithm for cigarette operation. Although not shown in FIG. 11, the e-Cig may include a memory as in FIG. 7. In particular, the controller may include or be coupled with a memory module. The memory module may have read only and read/write parts. The memory module may be implemented in a single module or in two or more different modules. The memory may be non-volatile in one embodiment. Volatile implementations of the memory may utilize the smartphone for memory storage and retrieval. The e-Cig controller may be able to read all memory parts and write in the part where read/write is allowed. For the use of subsystem parameters the read only parameters may include default value, allowable values, and allowable limits.

The memory may store usage parameters (e.g. smoking length, frequency, puff length, droplet size, airflow, temperature, etc.) that may be monitored and controlled. The memory may be large enough to hold all information about a single puff, including time, duration and power consumption data. In addition it may include data about the temperature, power consumption and any other parameter from any sub-unit of the e-Cig. The user may use an app on the smartphone to set certain limits for certain parameters (i.e. input values). The input value 1402 is provided and the algorithm may check whether value is within range 1406 and look for other restrictions such as integer conformity. The memory stores the maximum/minimum values 1404. If the value is not restricted in 1408, a new input value is received 1410. If the input value is not within range 1406 or is restricted 1408, the parameter will not be changed and an error message is transmitted 1412.

An example of this is the selection of an atomizer, when there are two atomizers (e.g. FIG. 5). Value one and two (atomizers one, two) are both legal and limit the range of legal values. Another example is inputting the parameters 0-1 to the PWM of the first atomizer. The lower limit is 0, the upper limit is 1 but only numbers and all values between are allowable. Therefor the value 0.015 is allowable and 1.05 is not allowable. The suggested algorithm may be in the e-Cig controller and/or in the smartphone application. Any change in parameters that are monitored by the e-Cig may result in a change in any sub-unit's behavior.

Figure 15:
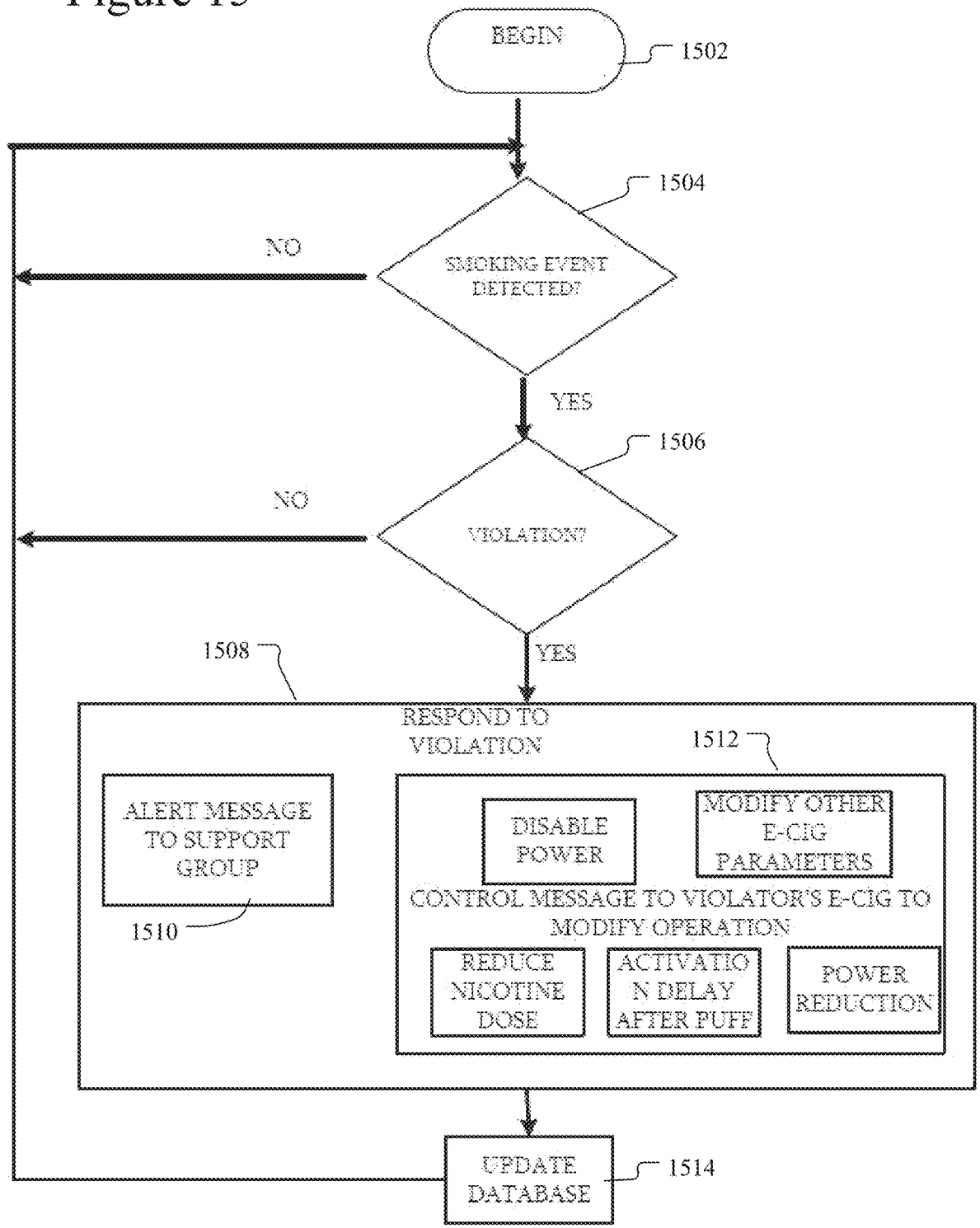
FIG. 15 is a flow chart for smoking control.

FIG. 15 is a flow chart for smoking control. In one embodiment, the user may interface with the e-Cig through the smartphone app to set limits on smoking 1502. The limit may be referred to as a violation that is detected 1506 after detecting any smoking event 1504. When a violation occurs, the e-Cig and/or smartphone can respond to the violation 1508. In one embodiment, the response may include a notification sent to a social network 1510. The notification may be through an email, text message, instant message, or through the smartphone app that connects with the e-Cigs. In response to the violation 1512, the e-Cig may also: 1) disable power; 2) modify other parameters; 3) reduce nicotine; 4) activate delay after puff; and/or 5) reduce power. This information may then be used to update the database 1514.

Figure 16:
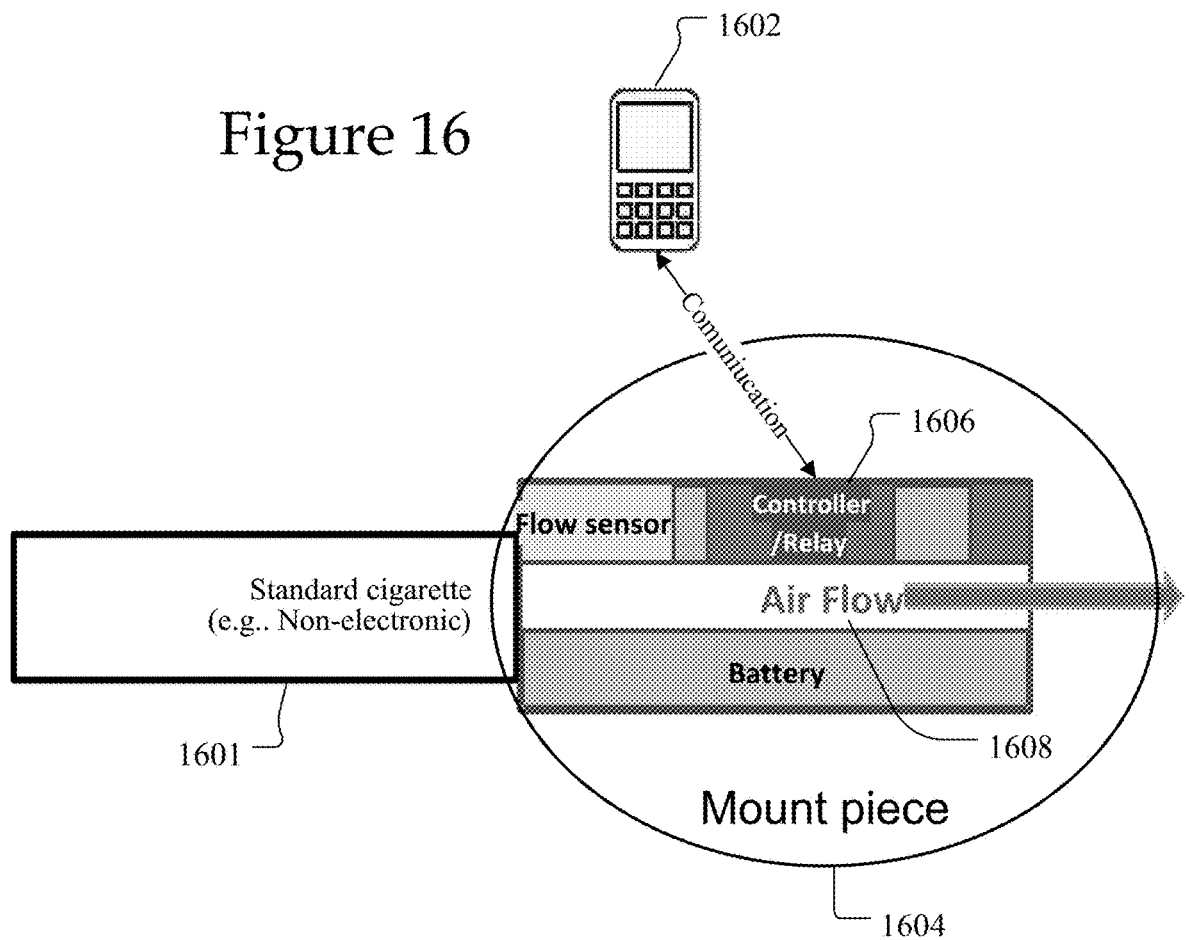
FIG. 16 illustrates an enhanced controller as part of a mount piece for regular cigarettes.

FIG. 16 illustrates an enhanced controller as part of a mount piece for regular cigarettes. In particular, the e-Cig features and the enhanced controller 1606 may be part of a mount 1604 structure that is utilized with a regular (non-electronic) cigarette 1601. The embodiments for the e-Cig described herein may be applied in a mouthpiece structure (a/k/a mount piece 1604) that holds regular cigarettes 1601. The mount piece 1601 receives the cigarette 1601 and the controller 1606 may provide any of the features discussed herein with respect to an e-Cig. For example, the enhanced controller 1606 that is a part of the e-Cig may provide the same or similar features for the standard cigarette 1601 as for an electronic cigarette as described. In particular, the control, tracking, social networking, and other features may be applied to the standard cigarette 1601 and may include communications, such as the communication with a smartphone 1602. The mount piece 1604 illustrates the air flow 1608 from the standard cigarette 1601 that can be monitored, measured, analyzed and communicated by the controller 1606.

Figure 17:
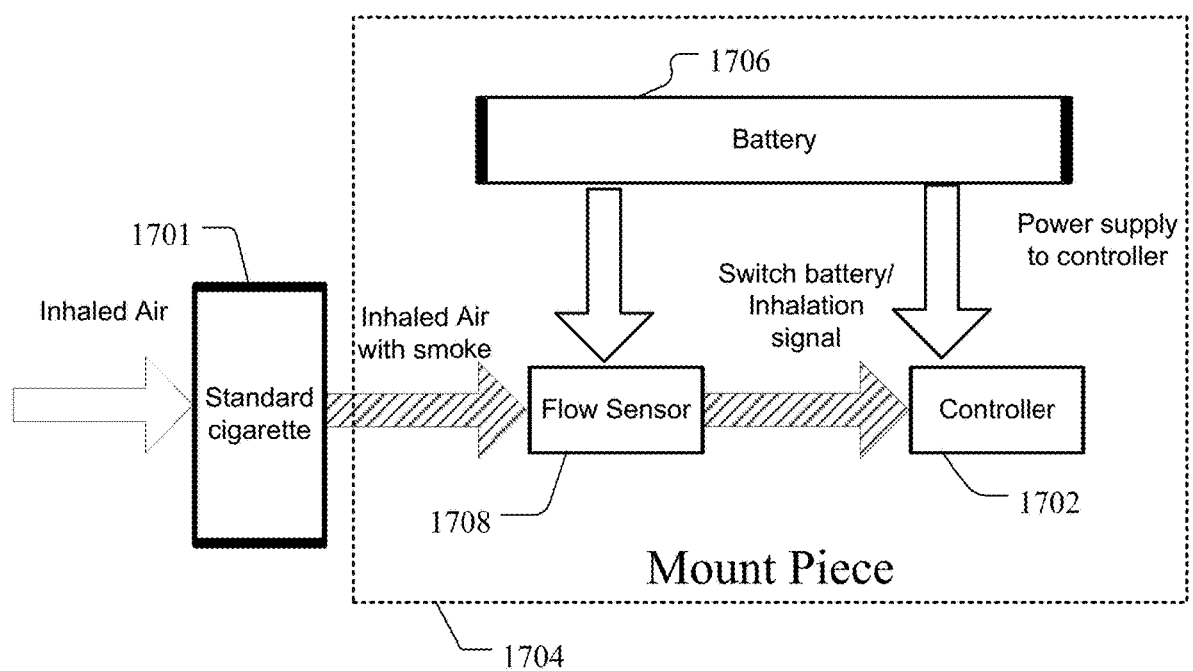
FIG. 17 illustrates a flow diagram for the mount piece.

FIG. 17 illustrates a flow diagram for the mount piece 1704. Inhaled air through the standard cigarette 1701 provides inhaled air with smoke to the mount piece 1704. A flow sensor 1708 may determine the presence of the air (e.g. to start up the device). The flow sensor 1708 may signal the controller 1702 to begin operations. The battery 1706 provides power to the flow sensor 1708 and/or the controller 1702. The mount piece 1704 includes all the electronic components and a mount for receiving and coupling with the standard cigarette 1701. The controller 1702 may include any of the functions of the controller(s) discussed for the e-Cig.

An electronic cigarette communication network may be provided by an e-Cig server (e.g. the e-Cig server 708 in FIG. 7). A user of an e-Cig may have a mobile app that is part of the smartphone for connecting with the network. A social network of friends, family, or other users may connect through the network for communicating with one another and sharing e-Cig related information. Other devices may access certain (non-private or authorized to be shared) information from the network. There may be access to the network from other custom or third-party services/applications. There may be an app for the smartphone provided by the e-Cig server provider or e-Cig manufacturer, but other (third-party) applications may also receive (potentially limited) access to the network. Data from the network may be used for research and/or clinical trials.

Health care professionals may also be connected with the network. For medical purposes, information may be collected through the network (e.g. by the e-Cig server) for one or more users. The users may be grouped (e.g. by amount, frequency, or duration of usage). Puff data (e.g. inhalation duration, frequency) may be collected and used to monitor for changes. For example, a change in puff data may be used for notifying a user of a potential illness (e.g. having a cold, pulmonary diseases status, distress). The smartphone linkage may be then be used for identifying and retrieving appropriate medical information (websites) for the particular potential problem. In another embodiment, the e-Cig may be used for the transfer/inhalation of a medical material (medicine) with supervision or monitoring by the smartphone. For example, an e-Cig may be used as a replacement for current inhalators for various medical applications. Future smartphones may include scent sensing devices (e.g. nanotechnology-based). The scent detection may be used with the e-Cig for various uses, including monitoring operation (based on scent) of the e-Cig. Materials may be introduced that create some designed response in case of illness.

As described above, various applications and programs may be performed on a smartphone or other device. Those applications and programs may further relate to marketing of a product, with an e-Cig being one example of such a product. As described below, the marketing applications may provide for better user feedback and targeting. Although described in the context of a smartphone, a smartphone (and smartphone application) are merely one example of a platform for executing the marketing applications and programs described herein.

The smartphone may also include or execute an application to communicate content, such as, for example, textual content, multimedia content, binary files, numerical data, or the like. The smartphone may also include or execute an application to perform a variety of possible tasks, such as browsing, searching, playing various forms of content, including locally stored or streamed video, or games (such as fantasy sports leagues, or competitions such as e-Cig smokers competing on location-based assignments or any other games/activities involving community use). In one embodiment, there may be an application for receiving/displaying targeted marketing materials that include upsell offers or cross-sell offers based on the user's current usage (e.g. type of liquid that is preferred). The marketing may also include coupons based on the user's usage or preferences. Alternatively, a location identification mechanism (e.g. GPS, tower location, IP, etc.) may be used for targeting based on geography. Proximity to a retail location may be used for targeting that particular retailer.

The e-Cig may have the ability to determine the cartomizer's usage percentage; the ability to communicate with the smartphone; and the ability to develop applications to enable the implementation of digital marketing applications whose main objectives may include maximizing the average revenue per user and maximizing customer retention (churn prevention). The marketing application may be based on trigger events and actions taken as a result of the various trigger events. Exemplary trigger events include the cartomizer exceeding a usage threshold. For example, when the cartomizer is for example ⅓ full or lower, a message is transmitted the smartphone application and one or more of the following actions can be taken: 1) an alert is issued to the smoker; 2) one or more discount coupon(s) is (are) offered to the smoker toward the purchase of new cartomizers; 3) a link to online purchase of new cartomizers is displayed for immediate purchase and payment; and/or 4) additional offers can be proposed to the smoker based on his/her profile or usage (e.g. cross-sell similar liquid flavors).

Location information may be used to present to the user all retail locations in the immediate surroundings that sell cartomizers. The retailers may support online purchase pickups and the purchase/payment can be executed immediately so all the smoker has to do is pick-up the purchased item from the nearby retail outlet. Related products may be offered e.g. offering the smoker a different flavor at an introductory discount if he/she places the order for the replenishment cartomizers. Other products can be bundled to the offer based on the smoker's profile and the business relationship and integration between the marketing application vendor and the commercial outfit. For example, if the cartomizers are available for sale in a nearby drugstore chain outlet, a message can be sent to the drugstore chain's marketing server, the latter uses its own business intelligence capabilities to determine that the smoker for example is a heavy buyer of diapers, then sends back to the marketing application a coupon that includes a discount on diapers bundled to the purchase of new cartomizers. In other words, the offer may be unrelated to e-Cigs in one embodiment. Business agreements may be put in place so that for example the purchase of the new cartomizers be charged to the smoker's cellular carrier's pre-paid balance. Moreover, this can be bundled with purchasing more minutes from the carrier.

Another exemplary trigger event may include inserting a new cartomizer to the cigarette. This event can trigger one or more of the following functions within the marketing system: 1) determine the company who sold the cartomizer and/or other retailer information based on the cartomizer's internal tag; and 2) determine based on the location information and the above-mentioned seller's information whether or not the smoker is still inside or nearby the retail outlet where the cartomizer was purchased. If the result is positive, new offers and coupons may be displayed as described in the previous trigger, for example new flavors, diapers etc. In case of a first-time user, special introductory promotions may be offered in order to convert the smoker from an "occasional buyer" to a "regular".

Other system-generated triggers may include the marketing system constantly analyzing the accumulated data, and enabling various triggers and responses. For example, patterns or trends in the smoker's e-Cig consumption may be detected that include increasing/decreasing, season-related, location-related (e.g. heavy smoking at work and no smoking at home), increasing/decreasing nicotine level, etc. These patterns may be used for triggering offers and promotions that are suited to the specific pattern detected. For example, if a pattern of gradually decreasing consumption is detected, actions can be taken to entice the smoker to buy more products. The detection may include identification of drastic changes. For example, a sudden drastic reduction in consumption or complete stoppage may be detected and drastic promotions can be used to prevent the user from switching to a competitor. Other changes may include location change or flavor change.

Data collection may be performed on a per user basis and may include analytics, data mining and the ability to message/coupon users not just from the e-Cig manufacturer, but targeted by retailers where the users bought the cartridges. A customer who bought carts from Chain X and Chain Y, can be pushed (through offers/coupons/promotions) back to the store of choice based upon variable algorithms. Also, stores can directly communicate coupons/offers to users with general offers as a function of anticipated need for cart replenishment.

As described, all the marketing offers (e.g. cross-sell, up-sell, etc.) may be utilized for any product and an e-Cig is merely one example. In particular, the marketing applications considered herein apply not only to e-Cigs, but may also apply to regular (smoke) cigarettes. The marketing systems and processes may apply to a wide variety of associated usage models and business models. In other embodiments, the marketing applications may apply to e-Cigs, regular tobacco cigarettes, smoking cessation products (e.g. nicotine patch or gum), related accessories (e.g. carrying cases, chargers, etc.), or other products. The other products may further include anything subject to the following areas: social networks of smokers, smoking cessation, shopping, couponing, ticketing, sweepstakes, lottery, gaming, travel, dating, and/or hobbies.

In the embodiment of an e-Cig product, certain events or actions may trigger a marketing offer. Exemplary events may include: connecting cartridge to e-Cig battery, disconnecting cartridge from the e-Cig battery, cartridge consumption events (e.g. consumption amounts/frequency), inhaling/taking in a puff, stopping the puff, and/or reading NFC/RFID tag from a product. Regarding the reading of a tag, a regular tobacco cigarette may be associated with a lot or box, and processing algorithms may determine that is the last cigarette in the box and others have been consumed based on previous events and associated timestamps, etc. Further, a tag may be used for nicotine reduction therapy (NRT) product, such as a path, lozenge, gum, etc. that may apply similar algorithms. The tagging (e.g. QR code or NFC sticker) may be read from any product, among which e-Cigs and regular cigarettes are merely exemplary.

Other triggering events may include connecting/disconnecting a charger to/from any rechargeable product. Location-based events may also act as a trigger for a marketing opportunity. Exemplary location-based events may include arriving to a new city, driving, being stopped in traffic, being at work, being at home, or venues (e.g. sports events, concerts, etc.). Accordingly, a presence at a particular location may trigger an offer (cross-sell or up-sell) or may be a prompt for product notifications or usage.

As discussed, the marketing applications may include offers. In addition, the marketing further include advertising. For example, different media (e.g. web, smartphone, email, etc.) may receive an advertisement depending on a particular trigger. The advertisement may be based on context (e.g. the trigger). For example, the context may include location-based, up-sell of known used products, cross-sell of related products, demographics, hobbies, etc. as derived from data-mining functions.

Exemplary data mining functions or other business intelligence may be information that is collected from the product. The collection may be based on a profile information associated with a smartphone. Exemplary information may include demographics (e.g. age, gender, race/ethnicity, household income, education level, geography, etc.). Further data mining may include shopping patterns, usage patterns (e.g. how the e-Cig is used: frequency, time of day, length/strength of puffs, etc.), travel patterns, and/or inferential data.

The data collected may be stored on the product (e.g. e-Cig) in one embodiment. Alternatively, the data may be stored on the smartphone (e.g. associated with an app on the smartphone) or stored over the network in a remote storage area that collects data for a number of users. The data collected may be analyzed and utilized for improved marketing. In other words, the data collected on users may be monetized in one embodiment. For example, there may be additional revenue from advertising, revenue from couponing, revenue sharing with third-parties via bundling of referral, subscription fees for premium services or with a "freemium" model, pay-per-download of smartphone applications (one-time fee), or revenue through the selling of data.

In one exemplary use case, there may be a smoking cessation application using e-Cig and a nicotine-reduction therapy (NRT) product. The linking with a smoking cessation product (e.g. nicotine patch) may be either "tightly coupled" (e.g. bundling the e-Cig with the smoking cessation product in the same offer), or "loosely coupled" (e.g. an application associated with the e-Cig that allows the user to configure a separately purchased nicotine patch). The potential benefits may include a better chance to succeed in quitting smoking, an improved social experience, and a clear framework in the form of a smoking cessation plan. In another embodiment, there may be a mixed e-Cig and tobacco cigarette smoking application. This application may track usage of the e-Cig and tobacco cigarette. The application may track the character of any e-Cig/tobacco "blend." The user may enter goals and the application can alert on deviations from the plan. In another example, location-based events or NFC tag events may indicate that user is stopped in traffic and has pulled out a cigarette. This data can be used to log a behavioral pattern, alert friends in social networks who can encourage him/her to wait for traffic jam to clear without smoking, etc. An exemplary upsell may include switching a user from being a casual user to a recurring user by offering a free or discounted rechargeable kit after consuming an e-Cig.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

We claim:

1. An electronic vaping device comprising:
  a cartridge including a first liquid container configured to retain a first liquid and a second liquid container configured to contain a second liquid;
  a communications interface configured to communicate with a mobile device; and
  a controller coupled to the communications interface, the controller configured to indicate, to the mobile device, when the electronic vaping device is activated, the electronic vaping device being activated in response to a pressure difference resulting from airflow through the electronic vaping device, and the controller being further configured to monitor vaping metrics for the electronic vaping device and to determine whether to draw from one or more of the first liquid container or the second liquid container based on the vaping metrics;
  wherein the mobile device is configured to provide targeted marketing communications in response to the controller indicating the electronic vaping device is activated;
  wherein the targeted marketing communications are based on whether the cartridge is added to the electronic vaping device or removed from the electronic vaping device, and the vaping metrics for the electronic vaping device; and
  wherein the vaping metrics include a vaping frequency, a type of the liquid, nicotine levels, strength of draw, length of draw, a time of vaping, or any combination thereof.

2. The electronic vaping device of claim 1, wherein the cartridge comprises:
  a heating element configured to heat liquid drawn from the first liquid container; and
  a wick configured to draw the liquid from the first liquid container.

3. The electronic vaping device of claim 1, wherein the targeted marketing communications include an upsell based on a liquid or a cross-sell for a related cartridge.

4. The electronic vaping device of claim 1, wherein the targeted marketing communications include coupons.

5. The electronic vaping device of claim 1, wherein
  the mobile device is further configured to receive locations of nearby retailers, and to determine a proximity of the mobile device to the locations of nearby retailers based on the location of the mobile device; and
  the targeted marketing communications include offers for the nearby retailers.

6. The electronic vaping device of claim 5, wherein the electronic vaping device stores a retail location where the cartridge was sold, and the mobile device is further configured to provide targeted marketing communications for the retail location.

7. The electronic vaping device of claim 1, wherein
  the mobile device is further configured to track vaping patterns associated with the electronic vaping device when the controller indicates the electronic vaping device is activated, the vaping patterns being based on the vaping metrics for the electronic vaping device; and
  the targeted marketing communications are further based on the vaping patterns associated with the electronic vaping device.

8. The electronic vaping device of claim 7, wherein the vaping patterns include patterns associated with the vaping frequency, the type of liquid, the nicotine levels, the strength of draw, the length of draw, the time of vaping, or any combination thereof.

9. The electronic vaping device of claim 1, wherein the mobile device is further configured to
  determine vaping patterns associated with the electronic vaping device based on the vaping metrics; and
  wherein
  the targeted marketing communications are based on the vaping patterns associated with the electronic vaping device.

10. The electronic vaping device of claim 1, wherein the communications interface is configured to provide the targeted marketing communications at the mobile device.

11. The electronic vaping device of claim 1, wherein the mobile device is configured to adjust settings associated with the electronic vaping device.

12. The electronic vaping device of claim 11, wherein the settings include temperature, vapor preference, droplet size, nicotine content, taste, degree of liquid depletion, vapor generation, vaping limits, or any combination thereof.

13. The electronic vaping device of claim 1, wherein the controller is further configured to communicate with a controller of another electronic vaping device and with another mobile device.

14. The electronic vaping device of claim 1, further comprising:
  a first section including the cartridge;

a second section including the communications interface and the controller, the first section configured to be removably coupled to the second section; and an identification code on an exterior surface of the first section;

wherein the mobile device is configured to read the identification code and determine a type and a taste of the cartridge.

15. The electronic vaping device of claim 14, wherein the controller is configured to activate the electronic vaping device in response to the mobile device reading the identification code.

* * * * *